US012459757B2

(12) United States Patent
Angerer et al.

(10) Patent No.: US 12,459,757 B2
(45) Date of Patent: Nov. 4, 2025

(54) VACUUM GRIPPING ELEMENT AND VACUUM GRIPPING DEVICE

(71) Applicant: TRUMPF Maschinen Austria GmbH & Co. KG., Pasching (AT)

(72) Inventors: Gerhard Angerer, Altenberg (AT); Klemens Freudenthaler, Linz (AT); Florian Hausmann, Traun (AT); Matthias Hoerl, Linz (AT); Nenad Kovjenic, Linz (AT); Florian Maier, Leonding (AT); Michael Schernhammer, Leonding (AT); Verena Steininger, Linz (AT); Helmut Theis, Pfarrkirchen (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 807 days.

(21) Appl. No.: 17/784,954

(22) PCT Filed: Dec. 16, 2020

(86) PCT No.: PCT/AT2020/060463
§ 371 (c)(1),
(2) Date: Jun. 13, 2022

(87) PCT Pub. No.: WO2021/119698
PCT Pub. Date: Jun. 24, 2021

(65) Prior Publication Data
US 2023/0081973 A1 Mar. 16, 2023

(30) Foreign Application Priority Data
Dec. 18, 2019 (AT) .............................. A 51107/2019

(51) Int. Cl.
*B25J 15/06* (2006.01)
*B25J 15/04* (2006.01)
*B65G 47/91* (2006.01)

(52) U.S. Cl.
CPC .......... *B65G 47/91* (2013.01); *B25J 15/0416* (2013.01); *B25J 15/0616* (2013.01)

(58) Field of Classification Search
CPC .... B65G 47/91; B25J 15/0441; B25J 15/0616
See application file for complete search history.

(56) References Cited

U.S. PATENT DOCUMENTS 5,193,776 A * 3/1993 Nagai ................... B65G 47/91
248/309.3
6,213,521 B1 * 4/2001 Land ..................... F16L 37/244
285/361

(Continued)

FOREIGN PATENT DOCUMENTS

CN 207773667 U 8/2018
DE 10 2012 006 590 A1 10/2012

(Continued)

OTHER PUBLICATIONS

International Search Report in PCT/AT2020/060463, mailed May 3, 2021.

(Continued)

*Primary Examiner* — Thomas E Lazo
(74) *Attorney, Agent, or Firm* — Collard & Roe, P.C.

(57) ABSTRACT

A vacuum gripping element and device hold a component to be transported when subjected to a vacuum. The device includes a carrying device and at least one vacuum gripping element connected releasably to the carrying device as needed. The element includes a base body with at least one vacuum supply channel and an elastic, form-flexible sealing element. A locking coupling forms a first fastener for positively connecting and releasing the gripping element relative (Continued)

Figure 8:
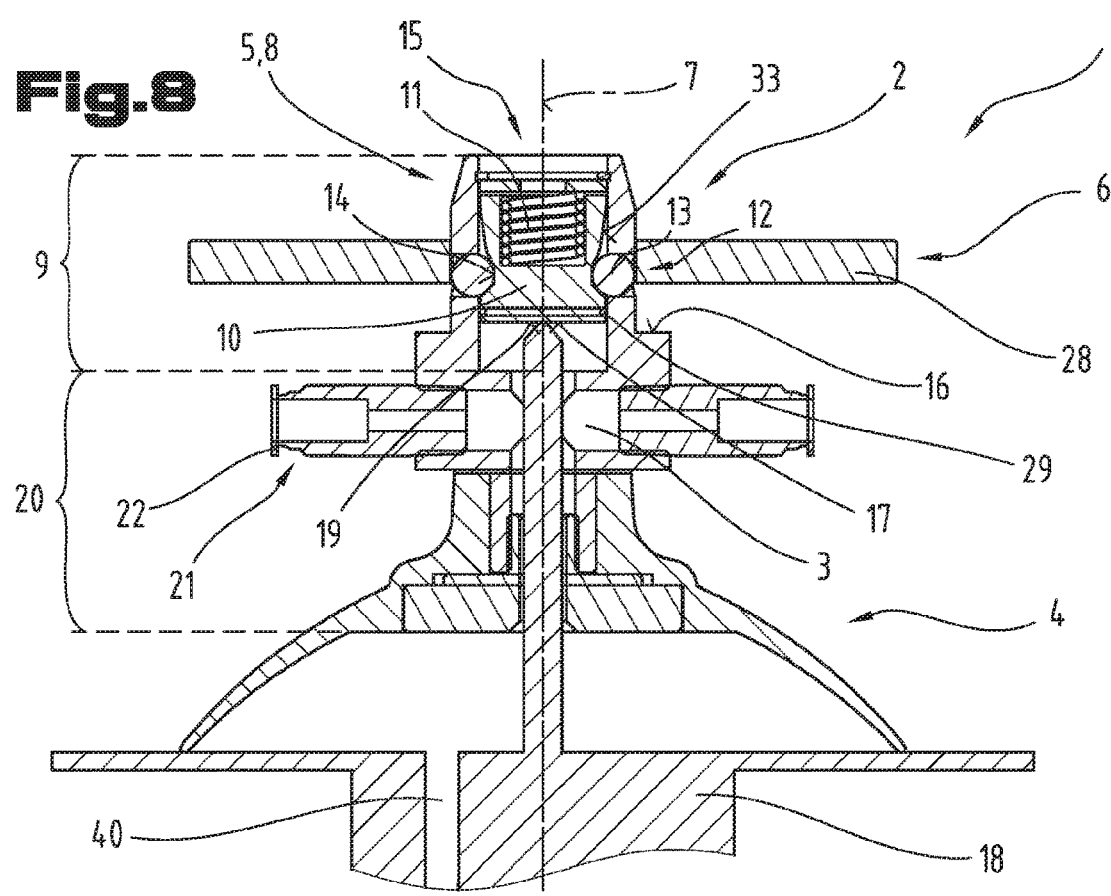

to the carrying device as required. Alternatively, the base body includes first and second base body parts, the first part positively connecting and releasing relative to the carrying device as required by the first fastener, and the second part being connected to the elastic, form-flexible sealing element. A locking coupling forms a second fastener for positively connecting and releasing the first base body part relative to the second base body part as required.

26 Claims, 10 Drawing Sheets

(56) References Cited

U.S. PATENT DOCUMENTS

| | | | |
|---|---|---|---|
| 6,579,027 | B1 | 6/2003 | Stolz |
| 7,540,309 | B2 * | 6/2009 | Perlman .................... F04F 5/52 294/64.2 |
| 7,950,422 | B2 * | 5/2011 | Perlman .................... F04F 5/52 294/64.2 |
| 8,523,255 | B2 | 9/2013 | Fukano et al. |
| 9,168,642 | B2 * | 10/2015 | Cho ..................... B25B 11/005 |
| 9,470,253 | B2 | 10/2016 | Ostlind |
| 2009/0206216 | A1 * | 8/2009 | Katsutani ............... B65G 47/91 248/205.8 |
| 2016/0201700 | A1 | 7/2016 | Smith |
| 2018/0361695 | A1 | 12/2018 | Balzer et al. |

FOREIGN PATENT DOCUMENTS

| | | |
|---|---|---|
| DE | 10 2012 003 192 A1 | 8/2013 |
| EP | 3 023 365 A1 | 5/2016 |
| JP | S55-120491 U | 8/1980 |
| JP | S57-122388 U | 7/1982 |
| JP | S58-889 U | 1/1983 |
| JP | H05-6912 A | 1/1993 |
| JP | H07-29311 U | 6/1995 |
| JP | H09-216186 A | 8/1997 |
| TW | M492901 U | 1/2015 |
| WO | 99/37428 A1 | 7/1999 |
| WO | 2015/123128 A1 | 8/2015 |
| WO | 2016205486 A1 | 12/2016 |

OTHER PUBLICATIONS

Suction cups for the packaging industry, Vacuum Automation Components Catalogue. Edition 14_p. 153 153; https://cdn.schmalz.com/media/05_services/catalog/va/Komponenten-Katalog.pdf, downloaded Jan. 5, 2021.

* cited by examiner

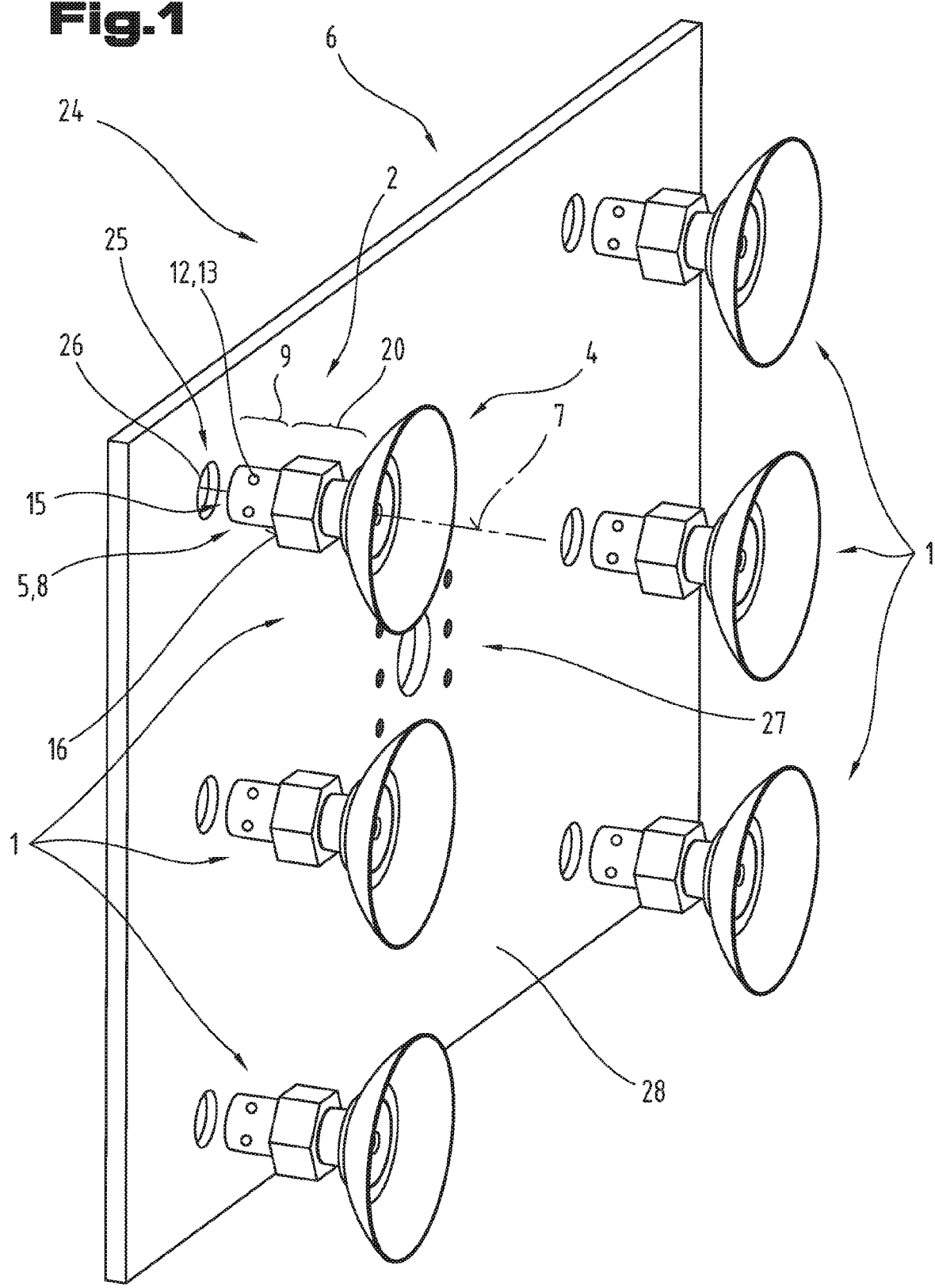

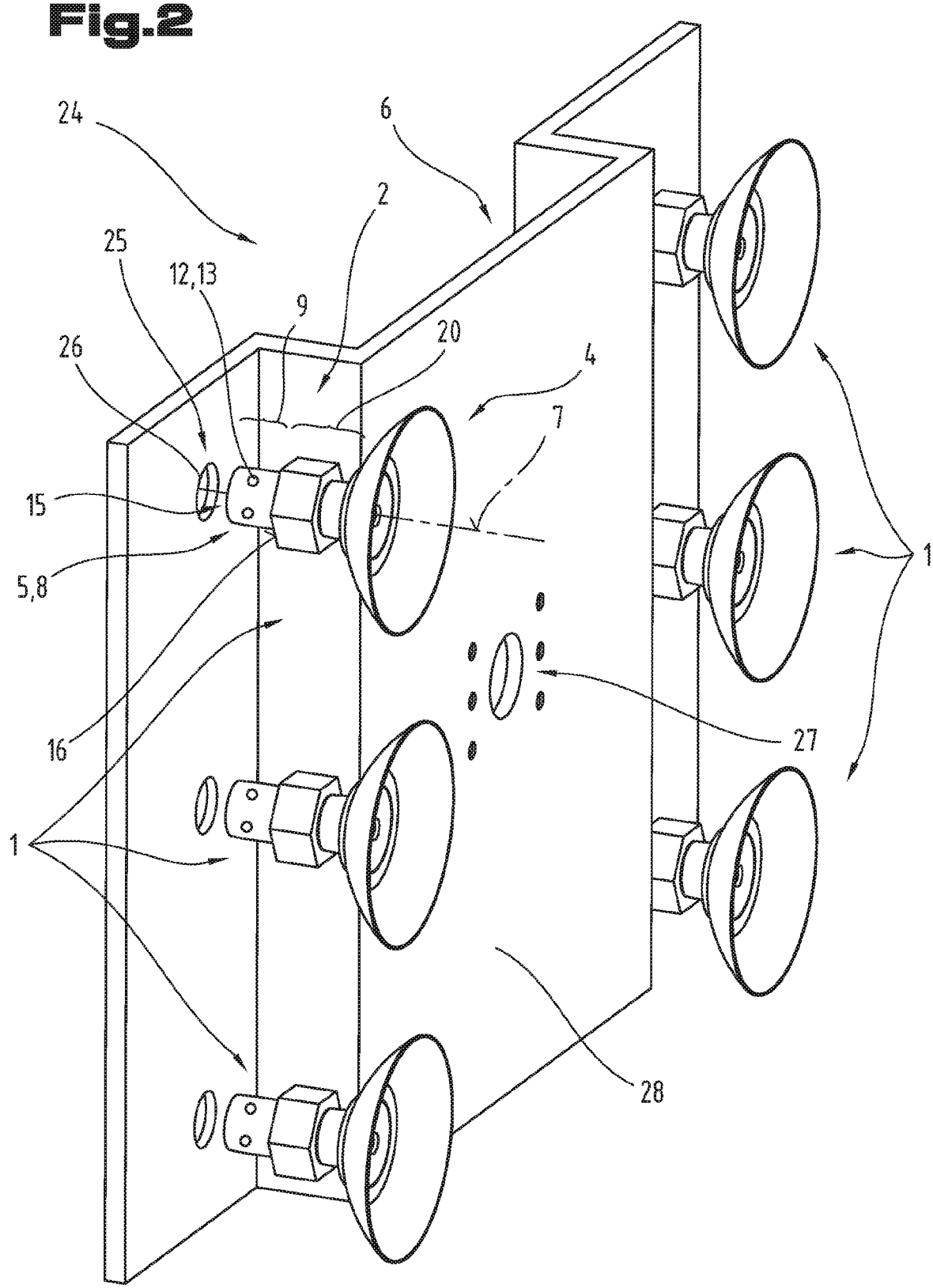

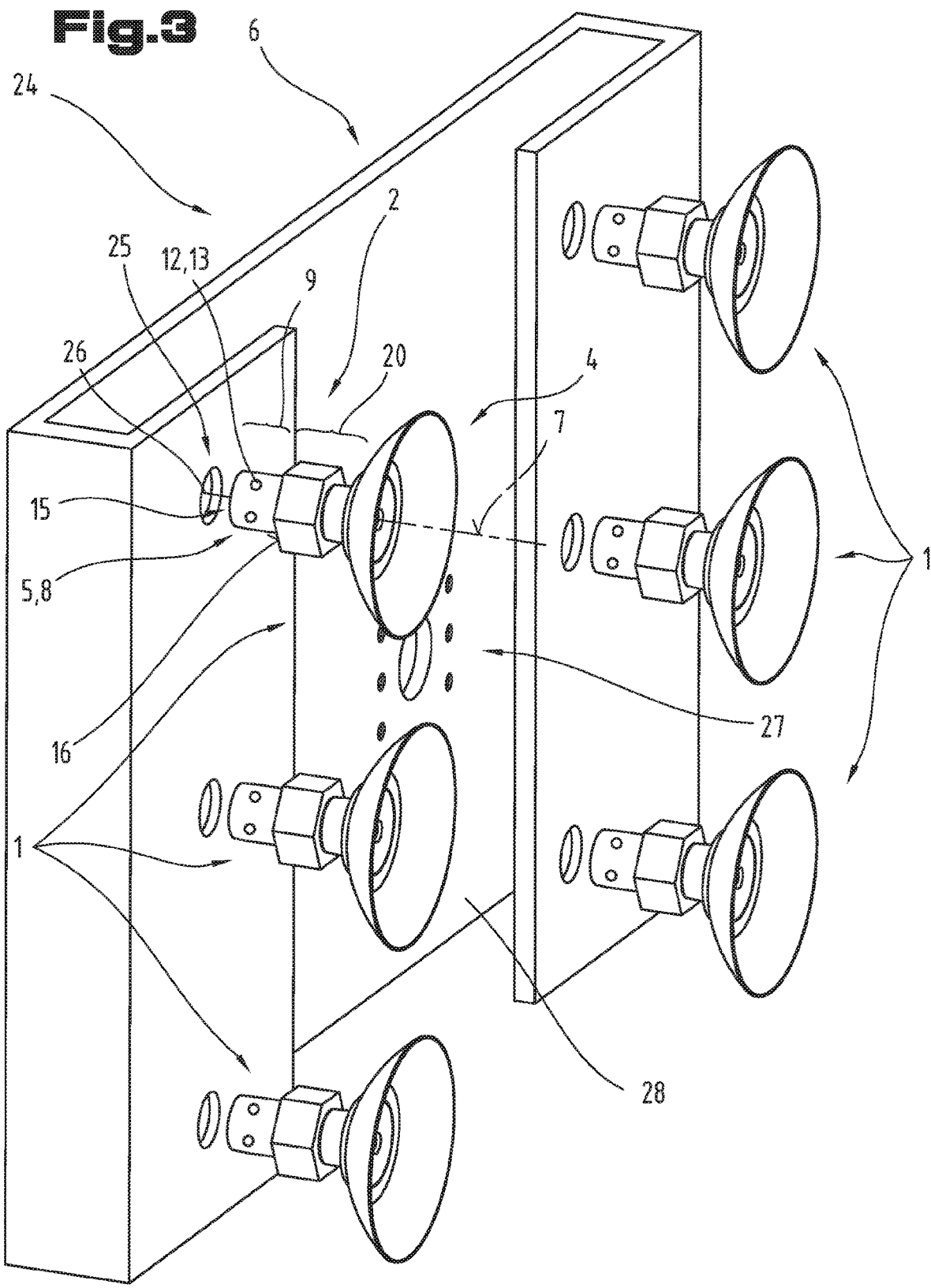

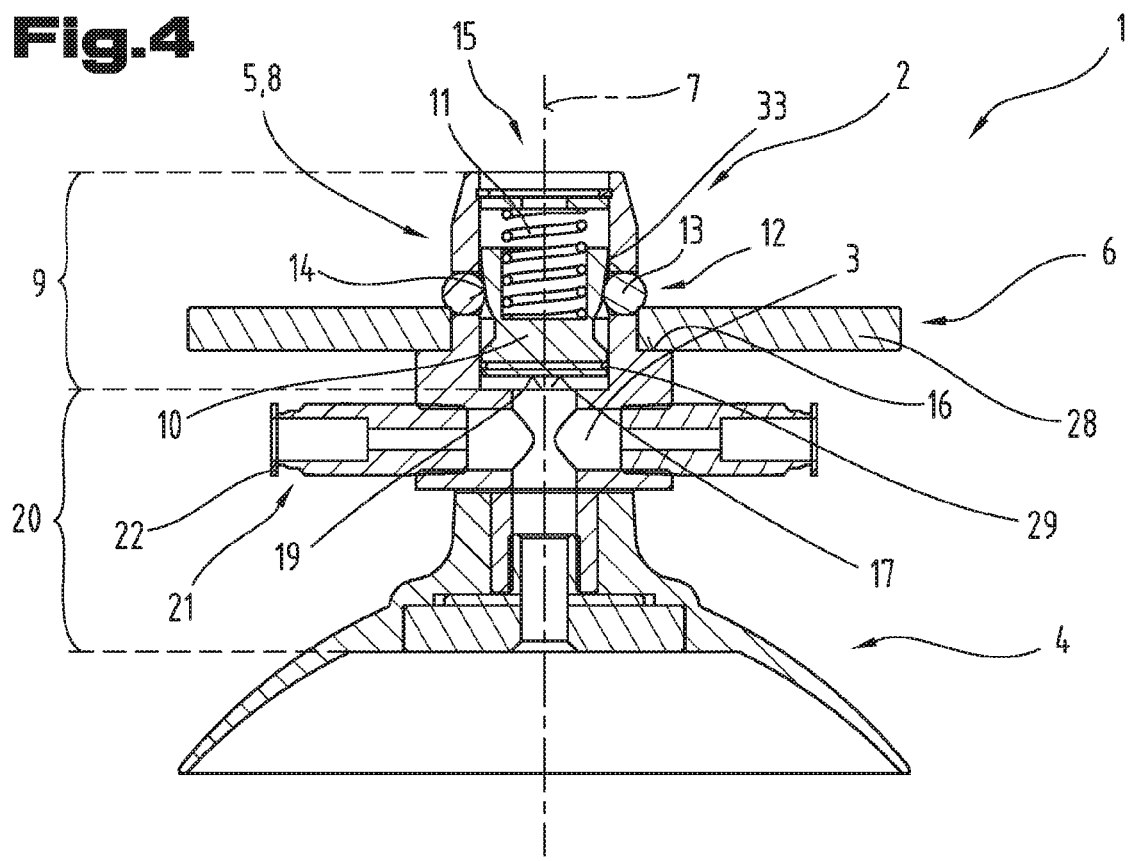
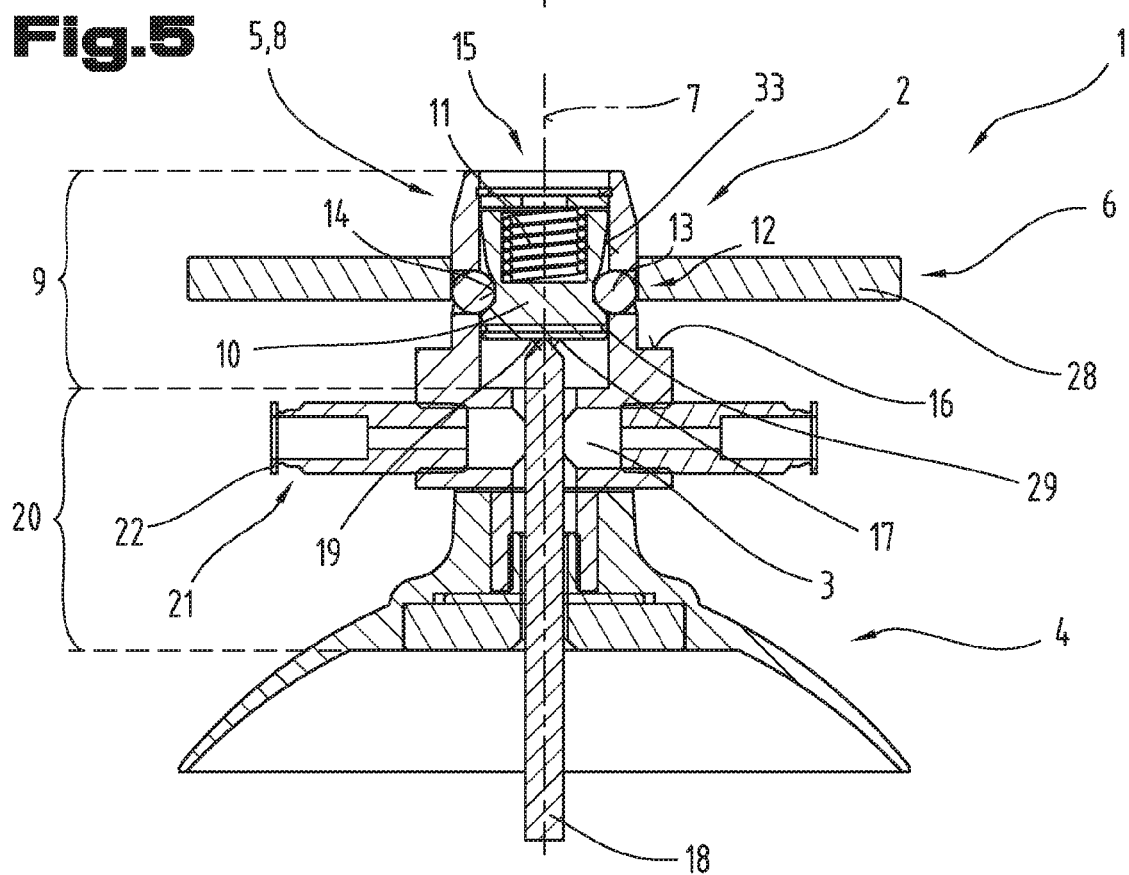

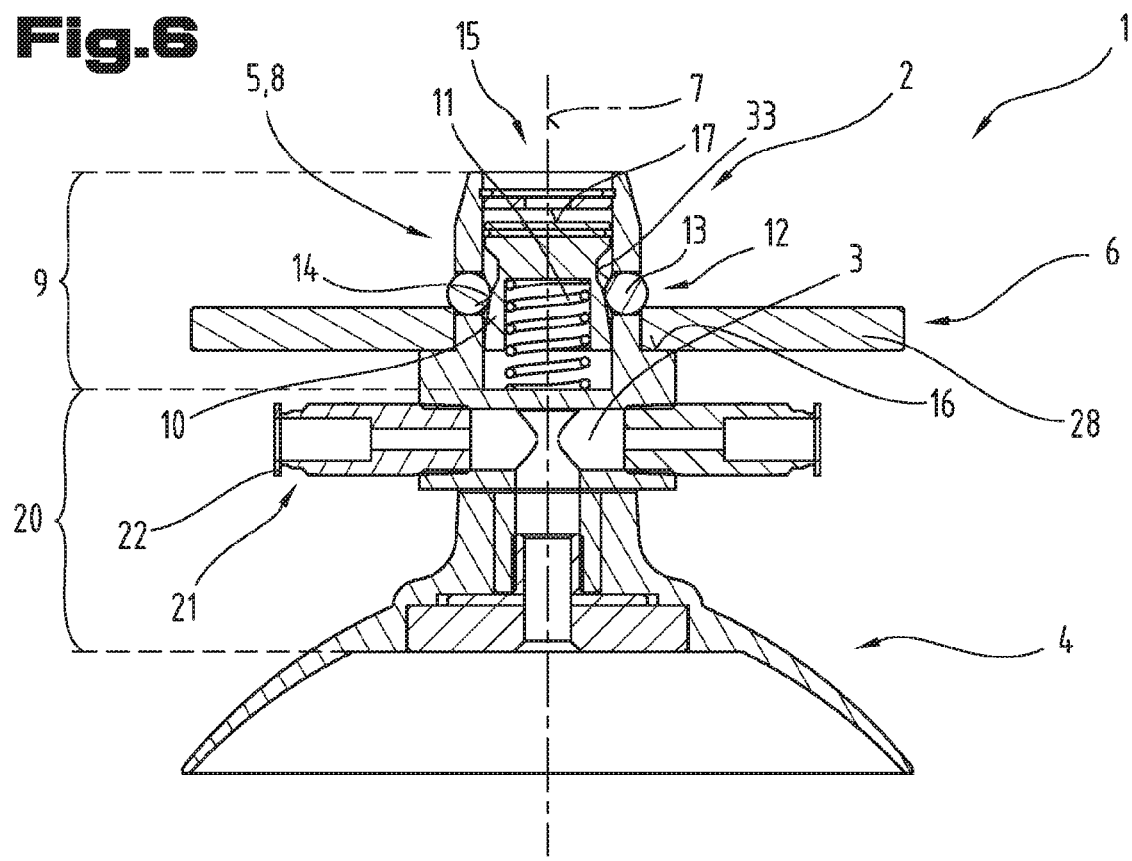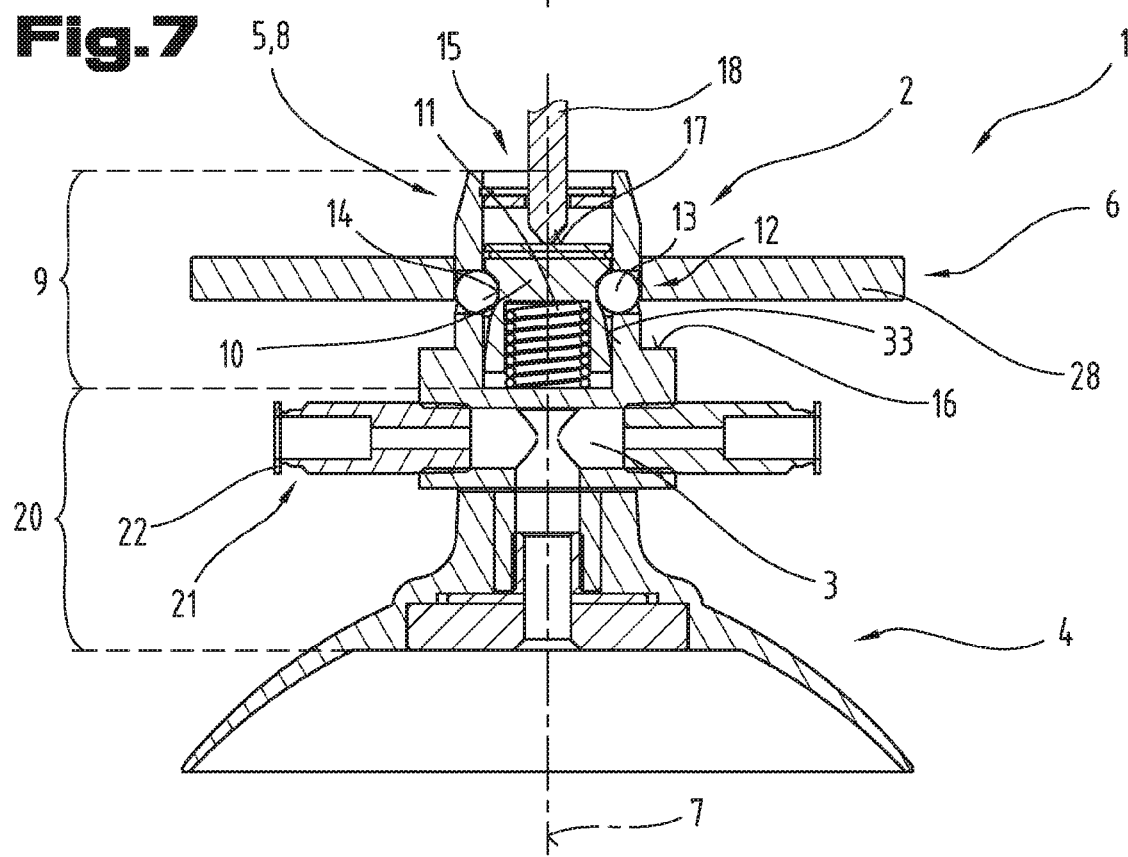

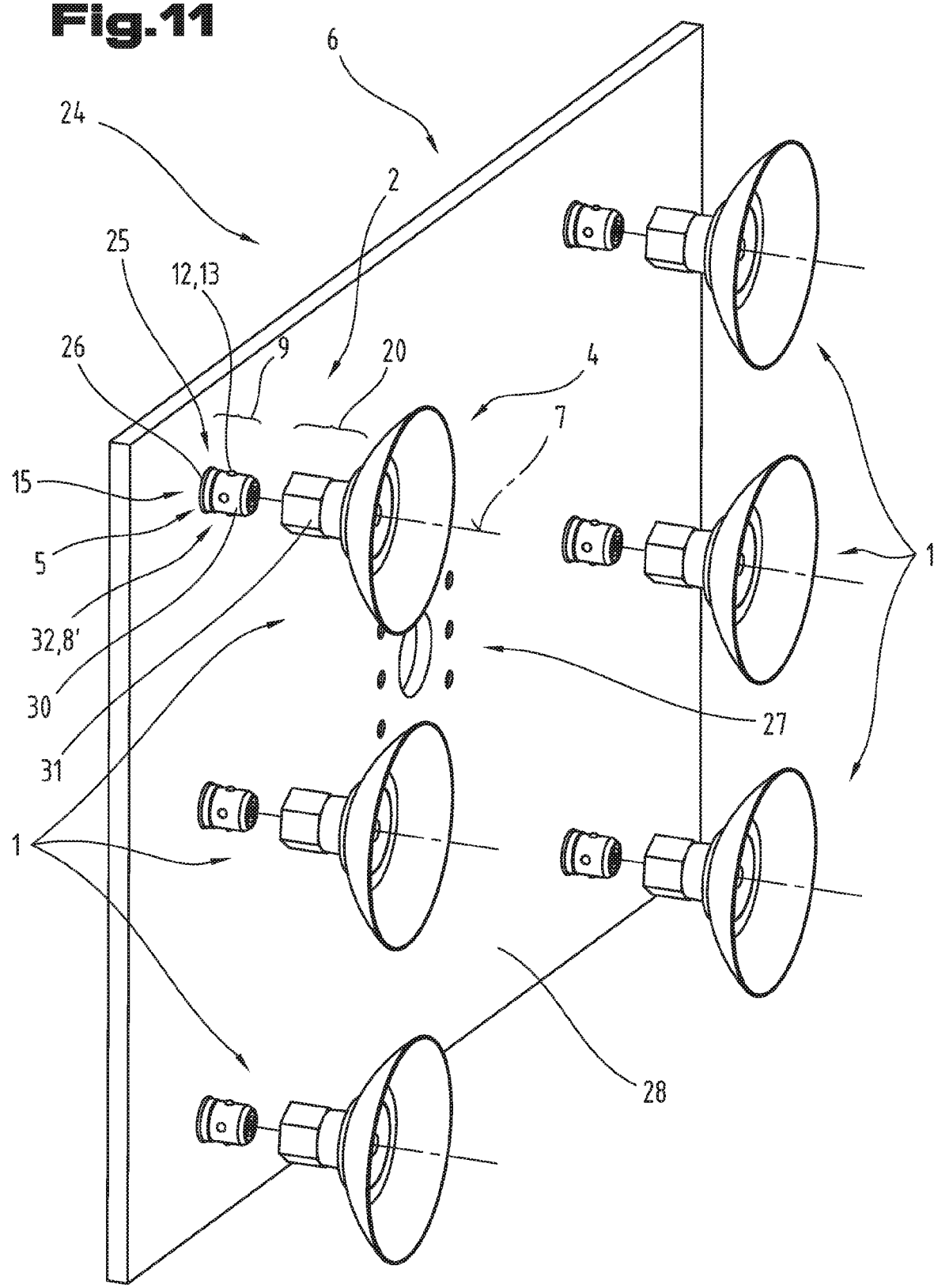

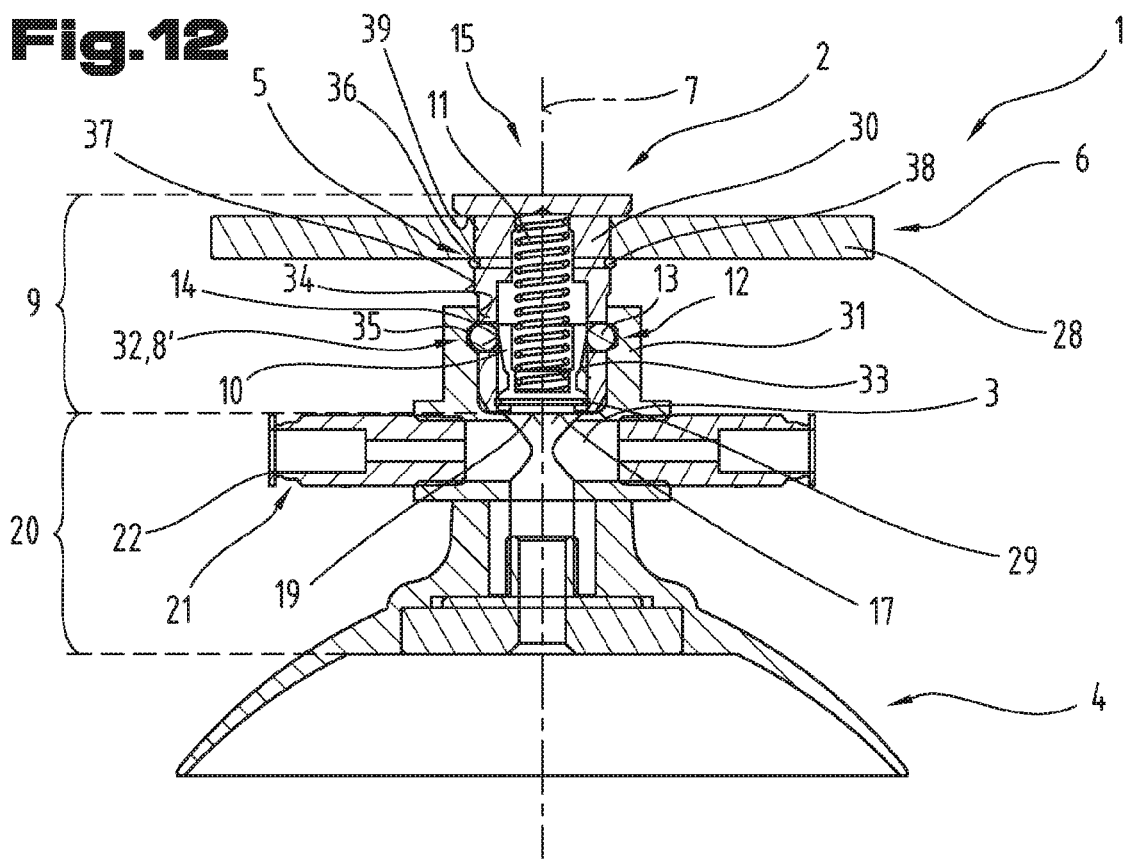
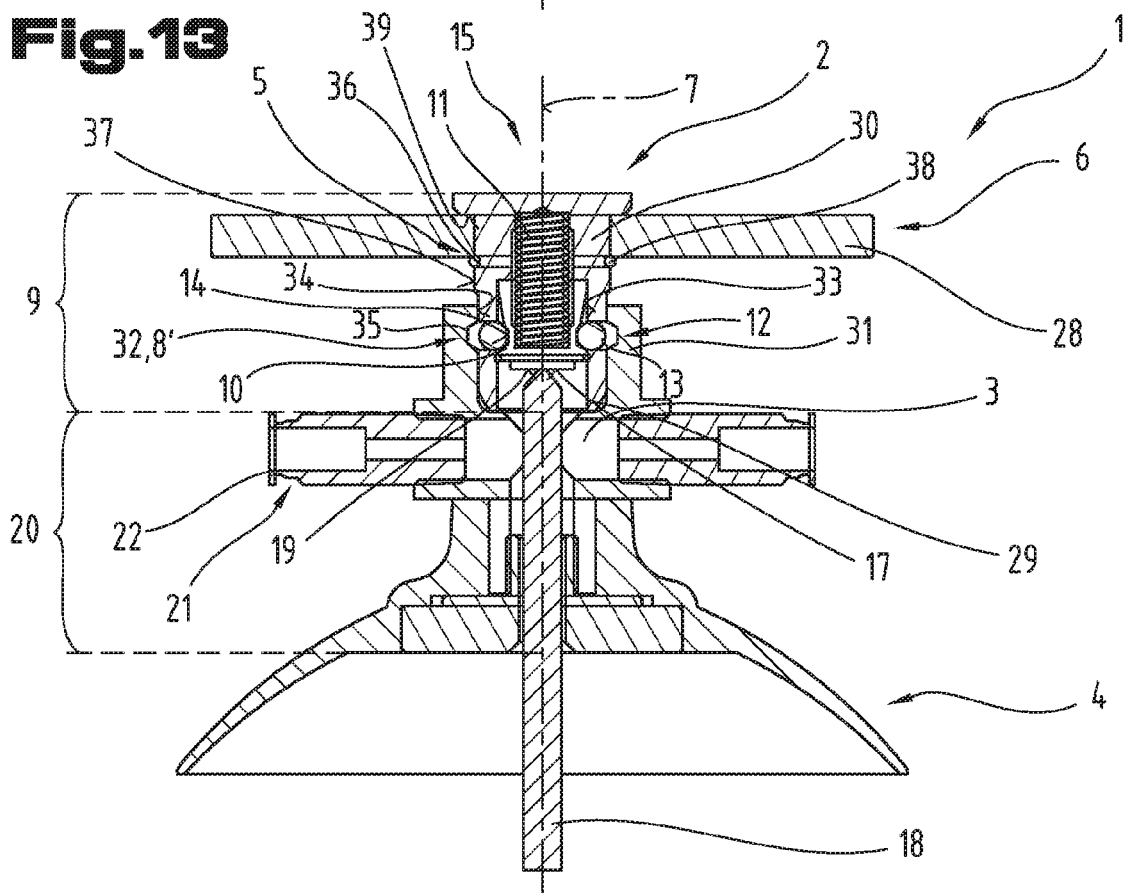

VACUUM GRIPPING ELEMENT AND VACUUM GRIPPING DEVICE

CROSS REFERENCE TO RELATED APPLICATIONS

This application is the National Stage of PCT/AT2020/060463 filed on Dec. 16, 2020, which claims priority under 35 U.S.C. § 119 of Austrian Application No. A51107/2019 filed on Dec. 18, 2019, the disclosure of which is incorporated by reference. The international application under PCT article 21 (2) was not published in English.

The invention relates to a vacuum gripping element and a vacuum gripping device which are embodied to suck and/or hold a component to be transported when subjected to a vacuum.

In modern processing centers, workpiece and/or component transport is often carried out in a fully automated manner To manipulate components, in particular bending workpieces and profiles, the use of vacuum grippers has become widely established. These grippers have to be specially constructed, procured and assembled, especially for the production of special designs and/or even for small quantities. Due to these necessary measures, the unit costs are disadvantageously affected. In addition, the associated long delivery times also contribute to the inefficiency of this type of production.

Suction grippers with a plurality of suction cups on a common gripper head are known to the person skilled in the art for manipulating components or workpieces. For this purpose, the prior art describes a plurality of suction grippers which are, however, only suitable to a limited extent for use as grippers for special and customized products. To increase the efficiency of special and customized products of grippers, according to the prior art, diverse constructionally complex approaches for connecting vacuum gripping elements to flange plates are known.

For example, DE 102012006590 A1 discloses a suction device with an ejector, wherein a retaining bolt has a groove that engages with a locking plate, wherein the locking plate has a locking member such that when the locking member engages with the groove, the retaining bolt is pulled to one side of the adapter plate, and the suction pad is held between the adapter plate and the retaining bolt. Moreover, this retaining bolt has a vacuum passage communicating with the interior of the suction pad and also communicating with a vacuum generating section of the ejector.

DE 102012003192 A1 suggests a vacuum clamping device having a suction gripper which is composed of a suction unit having a suction cup and a plug-in connection unit. The suction unit has a tubular fastening piece with which it can be inserted into the plug-in connection unit and can be releasably fixed in this respect. The inserted fastening piece is held by at least one spring-elastically movable clamping element and can be removed again by manual actuation of solvents.

Various arrangements of suction elements with mechanisms for changing a cup-shaped sealing element are known to those skilled in the art from JP H0729311 U, JP S57122388 U and TW M492901 U.

It was the object of the present invention to overcome the shortcomings of the prior art and to provide a device by means of which a user can make handling of plate-shaped components as efficient as possible, in particular also when the components are present only in a small number and/or special products are to be produced and/or manipulated.

This object is achieved by a vacuum gripping element and a vacuum gripping device according to the claims.

The vacuum gripping element according to the invention serves for sucking in or holding a component to be transported when subjected to a vacuum. The vacuum gripping element comprises:
- a base body with at least one vacuum supply channel,
- an elastic, form-flexible sealing element which is connected to the base body and is provided for sealing contact with the component to be transported,
- a first fastening means on the base body for fastening the vacuum gripping element on a carrying device, wherein the base body and the sealing element are arranged along a main axis of the vacuum gripping element.

In this regard, it is further provided that the first fastening means is formed by a locking coupling for positively connecting and releasing the vacuum gripping element relative to the carrying device as required, or that the base body comprises a first base body part and a second base body part, said first base body part being provided for positively connecting and releasing relative to the carrying device as required by means of the first fastening means, and said second base body part being connected to the elastic, form-flexible sealing element, and that a second fastening means for positively connecting and releasing the first base body part relative to the second base body part is formed by a locking coupling.

The main advantage of this is that a vacuum gripping element embodied in this way makes it possible to manufacture components in small quantities and/or special designs in an economical manner. In particular, this constructionally simple but still reliably functioning embodiment of the vacuum gripping element allows for a particularly efficient assembly and disassembly with a small number of parts and/or components — as compared to the prior art — such that the vacuum gripping element is ready for use quickly.

The fact that the vacuum gripping element is formed of just a small number of components also facilitates the replacement time and significantly adds to an efficient stockkeeping.

The embodiment of the vacuum gripping element with a first fastening means, which is formed by a preferably manually operable locking coupling for positively connecting and releasing the vacuum gripping element relative to the carrying device as required, entails the advantage that an efficient assembly and disassembly of the vacuum gripping element on a carrier element can be carried out easily and, optionally, also without tools and/or automatically. Moreover, efficient assembly and disassembly can be carried out relatively quickly and error-proof also by less experienced assembly personnel.

The embodiment of the vacuum gripping element in which the base body comprises a first base body part and a second base body part, wherein the first base body part is provided for positively connecting and releasing relative to the carrying device as required by means of the fastening means, is also advantageous. In this regard, the second base body part is connected to the elastic, form-flexible sealing element. A second fastening means is formed for positively connecting and releasing the first base body part relative to the second base body part as required by means of a locking coupling. This embodiment entails the advantage that previous mounting of the first base body part on the carrying device is possible and that the second base body part can be assembled and disassembled in an efficient manner by means of the locking coupling.

The mechanism of the locking coupling moreover also contributes to an increase in safety for the assembly or operating personnel, since assembly and/or disassembly can be carried out quickly and easily and thus unwanted falling of individual components or of the entire vacuum gripping element can be largely prevented.

Furthermore, it can be useful if the base body has a hollow-cylindrical fastening section in and/or on which the locking coupling is formed. Hollow-cylindrical workpieces can advantageously be produced in a simple manner in standard manufacturing processes. Thereby, fastening the vacuum gripping element to the carrying device is enabled cost-effectively and in a simple manner Moreover, the hollow-cylindrical mounting section can define a part of the vacuum supply channel, whereby a compact and multi-functional construction is created. Moreover, a hollow-cylindrical embodiment of the fastening section can be sealed from the surroundings in a simple manner A simple, effective and cost-effective sealing can be realized, for example, by a sealing ring.

Furthermore, it can be provided that the locking coupling comprises an actuator element, a spring element and at least one locking element, wherein the spring element urges the actuator element into an end position, and wherein the at least one locking element is urged into a locking position by the actuator element. The provision of just a small number of constructional components in the locking coupling entails the advantage that simple mechanics usually offer increased reliability and/or are less susceptible to malfunctions and errors. The characteristic that the spring element urges the actuator element into an end position has the advantage that the vacuum gripping element and/or the locking coupling tends to aim for the locking end position as the standard state. Moreover, spring elements are structurally usually simple and inexpensive standard components. If, moreover, the locking element is urged into a locking position by the actuator element, the actuator element can be held in its end position with additional reinforcement. This embodiment thus has the effect that the vacuum gripping element preferably remains in its end position. Hence, it is made possible that the vacuum gripping element can be connected to the carrying device in a stable and secure manner, but still with relatively low assembly and force requirements.

Moreover, it can be provided that the at least one locking element is mounted so as to be adjustable radially to the main axis. Hence, a possibility of the first or second fastening means being formed by a locking coupling for positively connecting and releasing the vacuum gripping element relative to the carrying device as required, is created. The radial adjustability of the locking elements, for example in radial bores in the hollow-cylindrical fastening section of the vacuum gripping element, moreover entails the positive effect that the locking element can quickly assume their locking position and/or can quickly be brought out of this locking position again.

An embodiment according to which it may be provided that the at least one locking element is embodied as a ball, in particular by at least three, preferably five, balls arranged so as to be distributed across the circumference of the hollow-cylindrical fastening section, is also advantageous. Balls, like the spring element, are standard components and are therefore both inexpensive and easy and quick to procure. The arrangement distributed across the circumference of the hollow-cylindrical fastening section entails the advantage that a connection between vacuum gripping element and carrying device can be realized in a stable and secure manner A uniform distribution of the balls across the circumference of the hollow-cylindrical fastening section is particularly preferred, since this can effect a uniform form distribution.

According to an advancement, it is possible that the actuator element is arranged within the hollow-cylindrical fastening section and is mounted so as to be adjustable along the main axis. This structure can contribute to the simplicity of the actuator element and its functionality.

Furthermore, it can be useful if the actuator element is embodied in the form of a slider or piston and, on its outer lateral surface of the actuator element, has at least one contact surface to the at least one locking element that is inclined relative to the main axis. The slider-like or piston-like embodiment can be advantageous with respect to the functionality of the actuator element. A contact surface, to the at least one locking element, of the actuator element that is tilted towards the main axis can entail the desired effect that depending on the inclination angle of the contact surface and the geometry of the locking elements, the required clamping effect can be adapted and/or a functionally reliable self-locking can be achieved.

According to an advancement, it is possible that an annular-groove-shaped inner jacket indentation is formed on the inner lateral surface of the second base body part for receiving the at least one locking element. This advancement can facilitate positively connecting and releasing the first base body part relative to the second base body part as required, in that the at least one locking element is received in this inner jacket indentation.

Moreover, it can be provided that the hollow-cylindrical fastening section is limited by at least one stop surface starting from its axial end face in the direction towards the sealing element. The stop surface can advantageously serve to make contact with the carrying device and ensure clear relative positioning with respect to the carrying device. In this way, a clamping effect can be reinforced and a stable and secure connection between the vacuum gripping element and the carrying device can be established.

Moreover, it can be provided that a force effect of the spring element acts on the actuator element starting out from a free axial end face of the base body in the direction towards the sealing element. Thus, the possibility of the spring element sliding and/or pushing the actuator element in the direction towards the sealing element is created, and hence the actuator element can be held in its respective axial end position. This is particularly advantageous in that it can facilitate mounting the vacuum gripping element on the carrying device.

According to a particular embodiment, it is possible that a force effect of the spring element acts on the actuator element starting out from the sealing element in the direction towards the free axial end face of the base body. Hence, the possibility of the spring element sliding and/or pushing the actuator element away from the sealing element is created. This embodiment entails the advantage that the vacuum gripping element can be dismounted easily and/or comfortably.

In particular, it can also be advantageous if the actuator element comprises an actuating surface which is provided for the application of pressure starting out from a constructionally separate, pin-shaped actuating tool. In this regard, this pin-shaped actuating tool can be embodied both for manual actuation by an operator but also for automated actuation, for example by a manipulator.

The pin-shaped actuating tool can, for example, be a solid object such as a screwdriver. However, it also conceivable and advantageous if a flexible object is used for pressure application on the actuating surface. In this regard, it is conceivable to use a piece of hose, in particular a piece of a pneumatic hose.

Pin-shaped actuating tools, which are automatically guided by a manipulator, but also manually guided actuating tools can also comprise a plane and/or plate-shaped region. This can be advantageous, in particular, if the force effect of the spring element acts on the actuator element starting out from the free axial end face of the base body in the direction towards the sealing element. In this regard, the actuating surface must be actuated starting from the sealing element in the direction towards the free axial end face. The plane and/or plate-shaped region of the pin-shaped actuating tool can come in contact with the sealing element, whereby the sealing element is pressed downwards by the pressure application. The plane and/or plate-shaped region of the pin-shaped actuating tool can be formed with a vacuum supply line via which vacuum supply line a vacuum can be applied in the sealing element. This allows simultaneous actuation of the actuating surface in combination with controlled lifting of the vacuum gripping element from the carrying device. If required, the vacuum supply line can be connectable to a vacuum generator device, in particular a vacuum pump. To allow for a vacuum to exist between the sealing element and the plane and/or plate-shaped region of the pin-shaped actuating tool, it can be advantageous if the pin-shaped region of the pin-shaped actuating tool is formed for sealing the vacuum supply channel in the base body. The sealing effect can be achieved, for example, by means of a seal on the pin jacket. If the guidance of the pin-shaped actuating tool is carried out automatically by a manipulator, it can also be useful if multiple vacuum gripping elements can be dismounted from the carrying device at the same time.

Overall, with an actuator element comprising an actuating surface, a simple but efficient structure is realized, whereby—e.g. in comparison to a hollow-cylindrical sliding sleeve—a cost-effective and easy-to-handle structure is created.

An advancement according to which the actuator element comprises an effective surface limiting the vacuum supply channel, said effective surface being dimensioned such that when a vacuum is present in the vacuum supply channel the actuator element is increasingly urged into the direction of its end position, is also advantageous. The effect that is thus achieved is that the closing force of the spring is increased via the effective surface. On the one hand, this results in that the vacuum gripping element can be used to create a secure and stable connection with a component to be manipulated and/or transported. On the other hand, the total closing force is reduced by this share of force when the vacuum is removed. Thereby, the required exertion of force is reduced by this share of force during assembly and/or disassembly and can thus be carried out effortlessly.

Moreover, it can be advantageous if a locking valve, in particular a back pressure valve, is formed in the vacuum supply channel, said locking valve closing the vacuum supply channel in the direction towards the sealing element when a vacuum is present in the vacuum supply channel. Hence, the possibility of an automated and/or semi-automated disassembly is created. When the back pressure valve responds, it causes an airtight and/or nearly airtight seal of the sealing element and/or the vacuum gripping element against the environment. The excess pressure building up in the vacuum supply channel and in the sealing element as a result causes releasing of the sealing element from a component to be transported or from a disassembly tool.

In a further embodiment, it can be provided that the actuator element comprises an effective surface limiting the vacuum supply channel, said effective surface being dimensioned such that when an excess pressure is present in the vacuum supply channel, the actuator element is urged into the direction of its position deactivating the at least one locking element. In particular in combination with the locking valve described above, here, the possibility of an automated and/or semi-automated disassembly of the vacuum gripping element relative to a carrying device can be created. Since the excess pressure cannot escape via the locking valve, it exerts a force effect on the effective surface of the actuator element and thus initiates a movement of the actuator element from its end position and/or locking position into its release position for the at least one locking element, which can result in a controlled unlocking of the locking coupling.

Moreover, it can be useful for a supply section to be formed between the hollow-cylindrical fastening section and the sealing element in relation to the main axis. In this regard, the supply section in particular serves for supply of vacuum and/or excess pressure. A formation of the supply section between the fastening section and the sealing element entails the advantage that thereby, assembly and disassembly of pneumatic hose connections between the vacuum supply elements can be established in an easy and simple manner Moreover, it can be provided that the supply section is formed for supplying the vacuum gripping element with a vacuum at the first base body part. This measure can facilitate assembly and disassembly in an advantageous manner Here, it is conceivable, for example, that hose couplings and/or hoses for connection with a vacuum generator device are provided already during assembly of the first base body part, such that a final assembly, in the course of which the second base body part is mounted, can be carried out particularly quickly and easily.

According to a particular embodiment, it can be provided that the supply section is formed for supplying the vacuum gripping element with a vacuum at the second base body part. This measure can also facilitate assembly and disassembly in an advantageous manner In particular, this embodiment can entail the positive effect that the first base body part can be mounted easily and quickly, since possible hose couplings and/or hoses are provided only during the subsequent final mounting of the second base body part. Moreover, it can be provided that a vacuum supply connection, in particular at least one hose coupling that can be actuated without a tool, is formed in the supply section and is fluidically connected to the vacuum supply channel and that the vacuum supply connection can be connected to a vacuum generator device via a hose if required. This advancement advantageously contributes to comfortable and secure assembly and/or disassembly.

According to a preferred advancement, it can be provided that the vacuum supply channel is embodied being flow-tight after positively connecting the first base body part relative to the second base body part by means of the locking coupling. This advancement can entail the advantage that a flow-tight vacuum supply channel is formed in one work step, in particular directly by the positive connection of the two base body parts. This can have a positive effect on the mounting duration.

Moreover, it can be provided that the first fastening means is formed by a spring ring arranged in an annular-groove-shaped outer jacket indentation on the outer lateral surface of the first base body part. Spring rings are cost-effective components and are simple and practical to use. During assembly and disassembly, the spring ring can be compressed in its circumference due to its spring action, which allows the spring ring to move temporarily into the annular-groove-shaped outer jacket indentation. Hence, the clamping effect between the spring ring and the carrying device can be temporarily deactivated and assembly and/or disassembly can be facilitated.

Furthermore, it can be useful if the first fastening means is formed by a thread arranged on the outer lateral surface of the first base body part. Threads are stable and secure fastening means. In particular, quick and secure fastening can be realized by the provision of an outer thread on the outer lateral surface of the first base body part and an inner thread on the inner lateral surface of an opening in the carrying device. Additionally, it can also be useful if a nut is additionally screwed onto a section of the first base body part that extends beyond the carrying device in order to secure this connection.

Moreover, it can be provided that the first base body part is limited by at least one flange surface starting out from the sealing element in the direction towards an axial end face. This flange surface, acting as a stop surface, can contribute to the stability of the fastening of the first fastening means to the carrying device. This flange surface can, for example, be formed on a nut or on a section that is structurally fixed to the first base body part.

According to an advantageous advancement, it can be provided that a vacuum gripping device is embodied to suck or hold a component to be transported when subjected to a vacuum. The vacuum gripping device comprises:
  a carrying device and at least one vacuum gripping element, in particular a vacuum gripping element according to the embodiments described above, connected to the carrying device so as to be releasable as needed.
In this regard, the vacuum gripping element comprises:
  a base body with at least one vacuum supply channel,
  an elastic, form-flexible sealing element which is connected to the base body and is provided for sealing contact with the component to be transported,
  a first fastening means on the base body for fastening the vacuum gripping element on a carrying device, wherein the base body and the sealing element are arranged along a main axis of the vacuum gripping element.

In this regard, it is further provided that the first fastening means is formed by a locking coupling for positively connecting and releasing the vacuum gripping element relative to the carrying device as required, or that the base body comprises a first base body part and a second base body part, said first base body part being provided for positively connecting and releasing relative to the carrying device as required by means of the first fastening means, and said second base body part being connected to the elastic, form-flexible sealing element, and that a second fastening means for positively connecting and releasing the first base body part relative to the second base body part is formed by a locking coupling.

The main advantage of this is that a vacuum gripping element embodied in this way makes it possible to manufacture components in small quantities and/or special designs in an economical manner In particular, this constructionally simple but still reliably functioning embodiment of the vacuum gripping element allows for an efficient assembly and disassembly with a small number of parts and/or components—as compared to the prior art—such that the vacuum gripping element is ready for use quickly.

The fact that the vacuum gripping element is formed of just a small number of components also facilitates the replacement time and significantly adds to an efficient stockkeeping.

The embodiment of the vacuum gripping element with a first fastening means, which is formed by a locking coupling for positively connecting and releasing the vacuum gripping element relative to the carrying device as required, entails the advantage that an efficient assembly and disassembly can be carried out easily and, optionally, also without tools and/or automatically. Moreover, efficient assembly and disassembly can be carried out also by less experienced assembly personnel.

The embodiment of the vacuum gripping element in which the base body comprises a first base body part and a second base body part, wherein the first base body part is provided for positively connecting and releasing relative to the carrying device as required by means of the fastening means, is also advantageous. In this regard, the second base body part is connected to the elastic, form-flexible sealing element. A second fastening means is formed for positively connecting and releasing the first base body part relative to the second base body part as required by means of a locking coupling. This embodiment entails the advantage that previous mounting of the first base body part on the carrying device is possible and that the second base body part can be assembled and disassembled in an efficient manner by means of the locking coupling. The mechanism of the locking coupling moreover also contributes to an increase in safety for the assembly personnel, since assembly and/or disassembly can be carried out quickly and easily and thus unwanted falling of individual components or of the entire vacuum gripping element can be largely prevented.

Furthermore, it can be provided that the carrying device comprises at least one opening for receiving the at least one vacuum gripping element. By the provision of an opening, the insertion of the vacuum gripping element and/or the locking coupling into the carrying device can be simplified and/or facilitated.

Moreover, it can be provided that the at least one opening is a circular bore. A bore for receiving the vacuum gripping element has the positive effect that bores can be produced by simple and common technical methods. In this regard, bores can usually be produced with sufficiently narrow tolerances and are consequently suitable for receiving the vacuum gripping element and/or its locking coupling.

Furthermore, it can be useful if the circular bore comprises a thread for receiving the first base body part. This advancement can contribute to quick and secure fastening, in particular by the provision of an outer thread on the outer lateral surface of the first base body part and an inner thread on the inner lateral surface of an opening in the carrying device.

An embodiment according to which it can be provided that the carrying device comprises a coupling means for connection to a manipulator as required in a central section, is also advantageous. The coupling capability of the carrying device is advantageous in terms of its flexibility or variability of use. The manipulator can, for example, be an industrial robot.

According to an advancement, it is possible that the carrying device comprises a plate-shaped carrier element, said plate-shaped carrier element being plane or having a DIN-rail-shaped or C-shaped cross section. Plane, plate-shaped carrier elements can be produced particularly easily and cost-effectively but can still be used in various ways. Plate-shaped carrier elements with DIN-rail-shaped cross sections facilitate the production of components with complex geometries. The embodiment of the plate-shaped carrier element with a C-shaped cross section is particularly suitable for vacuum gripping devices for transporting small components.

Furthermore, it can be useful if the main axis of the vacuum gripping element is arranged at a right angle to the plate-shaped carrier element. This embodiment not only facilitates assembly and disassembly of the vacuum gripping element on the carrying device, but also the planning and production of the structural components.

For the purpose of better understanding of the invention, it will be elucidated in more detail by means of the figures below.

Figure 9:
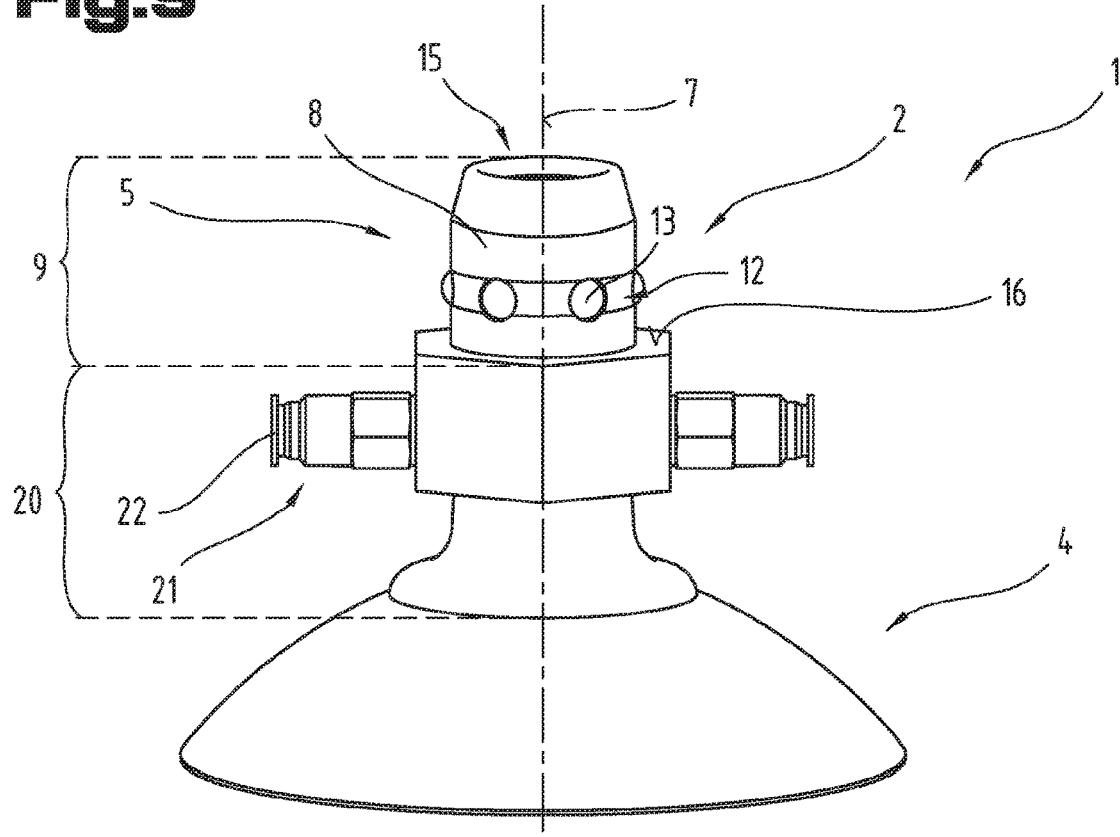
Figure 10:
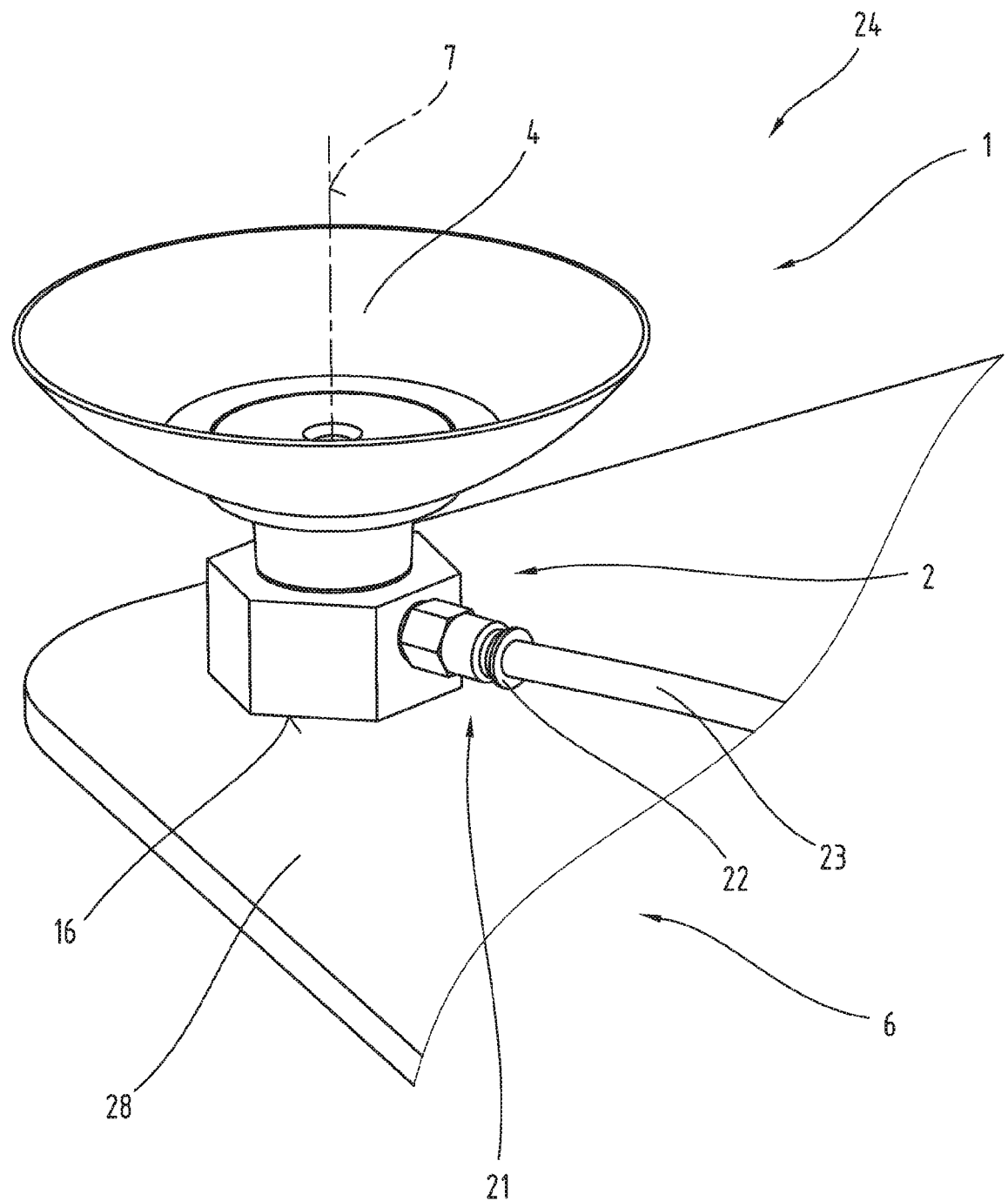
Figure 14:
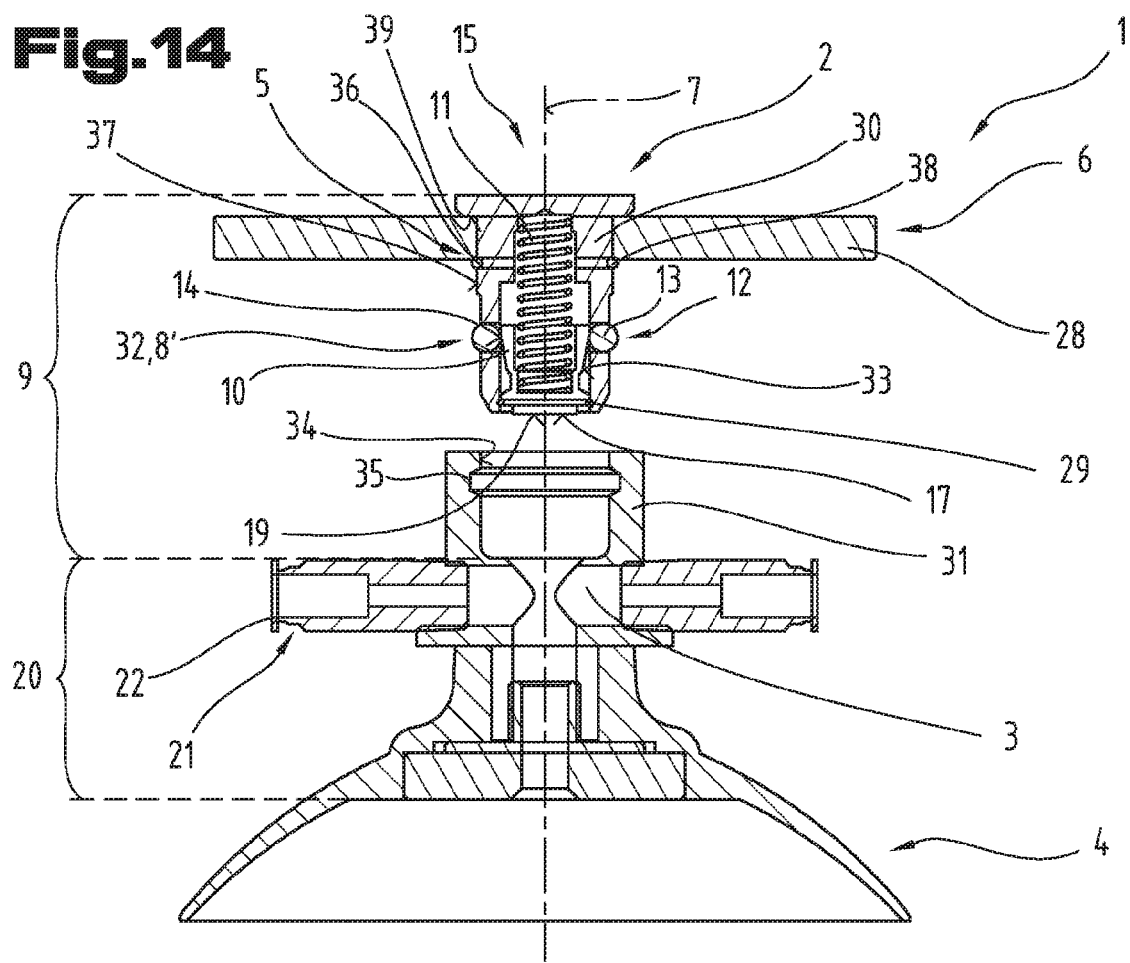
Figure 15:
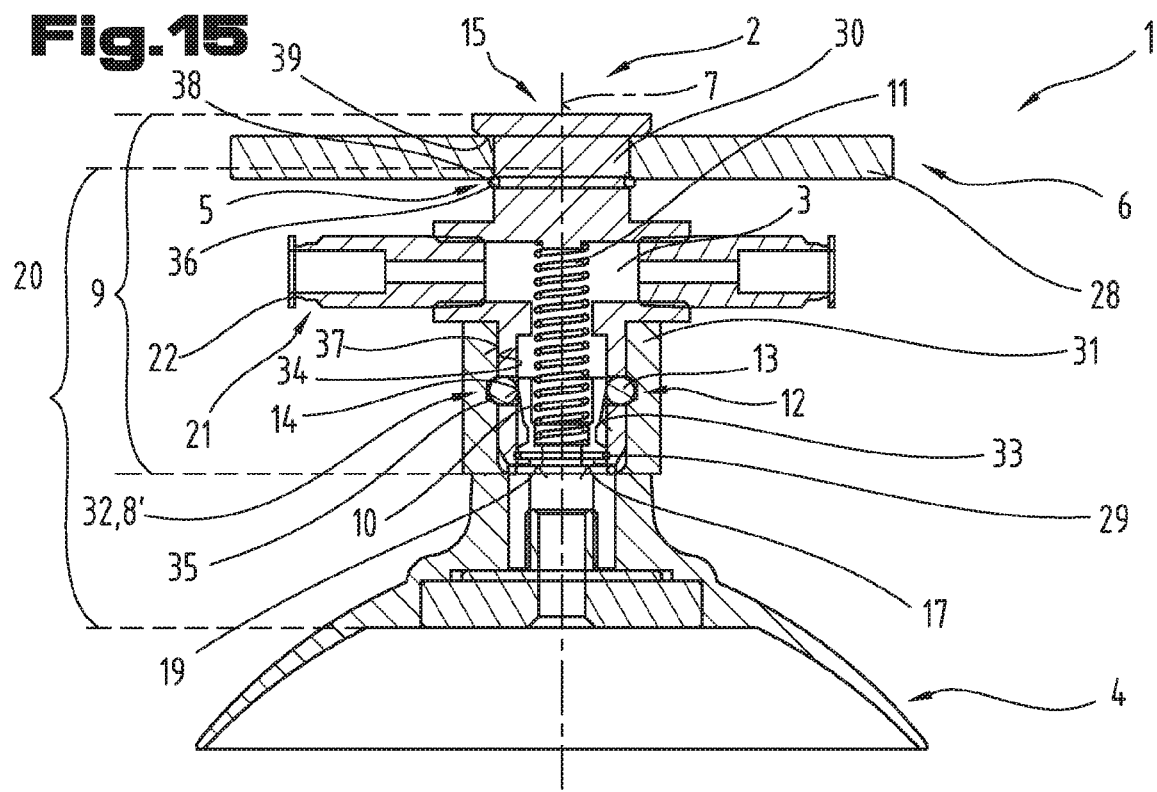

These show in a respectively very simplified schematic representation:

FIG. 1 a three-dimensional exploded view of a first embodiment of a vacuum gripping device with six vacuum gripping elements and a carrying device with a plane, plate-shaped carrier element;

FIG. 2 a three-dimensional exploded view of a second embodiment of a vacuum gripping device with six vacuum gripping elements and a carrying device with a DIN-rail-shaped, plate-shaped carrier element;

FIG. 3 a three-dimensional exploded view of a third embodiment of a vacuum gripping device with six vacuum gripping elements and a carrying device with a C-shaped, plate-shaped carrier element;

FIG. 4 a longitudinal section of a first embodiment of a vacuum gripping element mounted on a carrying device;

FIG. 5 a longitudinal section of a first embodiment of a vacuum gripping element during assembly or disassembly on a carrying device with an actuation tool;

FIG. 6 a longitudinal section of a second embodiment of a vacuum gripping element mounted on a carrying device;

FIG. 7 a longitudinal section of a second embodiment of a vacuum gripping element during assembly or disassembly on a carrying device with an actuation tool;

FIG. 8 a longitudinal section of a third embodiment of a vacuum gripping element mounted on a carrying device with an actuation tool;

FIG. 9 a three-dimensional view of a fourth embodiment of a vacuum gripping element;

FIG. 10 a three-dimensional detailed view of a fourth embodiment of a vacuum gripping device with a vacuum gripping element and pneumatic connections;

FIG. 11 a three-dimensional exploded view of a fifth embodiment of a vacuum gripping device with six vacuum gripping elements and a carrying device with a plane, plate-shaped carrier element;

FIG. 12 a longitudinal section of a fifth embodiment of a vacuum gripping element mounted on a carrying device;

FIG. 13 a longitudinal section of a fifth embodiment of a vacuum gripping element during assembly or disassembly with an actuation tool;

FIG. 14 a longitudinal section of a fifth embodiment of a vacuum gripping element before assembly or after disassembly;

FIG. 15 a longitudinal section of a sixth embodiment of a vacuum gripping element mounted on a carrying device.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a three-dimensional exploded view of a first embodiment of a vacuum gripping device 24 with six vacuum gripping elements 1 and a carrying device 6. As depicted, the vacuum gripping element 24 can comprise a carrying device 6 and, for example, six vacuum gripping elements 1 connected to the carrying device 6 so as to be releasable as needed. However, alternative geometries of the carrying device 6 adapted to the size and the weight of the components to be transported and/or held are also conceivable. The size, number and position of the vacuum gripping elements 1 can also be adapted to the specific requirements of the component to be transported and/or manipulated.

In the shown, first embodiment of the vacuum gripping device 24, the carrying device 6 comprises a plane, plate-shaped carrier element 28 with six openings 25 in the particular embodiment of circular bores 26. The carrying device 6, in particular the carrier element 28, comprises a coupling means 27 for connecting to a manipulator as required in a central section. In this regard, the coupling means 27 can, of course, be adapted to the requirements of different robot couplings and is thus shown merely by openings and/or bores.

According to the exemplary embodiment, the six constructionally identical vacuum gripping elements 1 shown in FIG. 1 essentially consist of a base body 2 and a sealing element 4. In the shown example, the sealing element 4 is a form-flexible, elastic suction bell made of a plastic material. The outlined base body 2 comprises a fastening section 9 and a supply section 20. In the supply section 20, a—non-depicted—vacuum supply connection 21, in particular a hose coupling 22 that can be actuated without a tool, can be formed. These are shown in FIG. 10. In this regard, the fastening section 9 is formed hollow-cylindrically and comprises a first fastening means 5 in the form of a locking coupling 8 having a positively locking effect. In this regard, the outside diameter of the locking coupling 8 is slightly smaller or equal to the bores 26 such that simple assembly and disassembly is possible but nevertheless no undesirably large clearance is given, respectively no unfavorably large gap is created. The six shown vacuum gripping elements 1 are preferably arranged at a right angle to the plate-shaped carrier element 28 in relation to a main axis 7 of the vacuum gripping element 1.

FIGS. 2 and 3 show two further and optionally independent embodiments of vacuum gripping devices 24, wherein equal reference numbers and/or component designations are used for equal parts as before in FIG. 1. In order to avoid unnecessary repetitions, at this point, it is therefore pointed to/reference is made to the detailed description in FIG. 1 preceding it.

FIG. 2 shows a three-dimensional exploded view of a second embodiment of a vacuum gripping device 24 with, for example, six vacuum gripping elements 1 and a carrying device 6. In the shown, second embodiment of the vacuum gripping device 24, the carrying device 6 comprises a DIN-rail-shaped, plate-shaped carrier element 28 with six openings 25 in the particular embodiment of circular bores 26 that are easy to produce.

FIG. 3 shows a three-dimensional exploded view of a third embodiment of a vacuum gripping device 24 with, for example, six vacuum gripping elements 1 and a carrying device 6. In the shown, second embodiment of the vacuum gripping device 24, the carrying device 6 comprises a C-shaped, plate-shaped carrier element 28 with six openings 25 in the particular embodiment of circular bores 26.

FIGS. 4, 5, 6, 7 and 8 show longitudinal sections of different embodiments of a vacuum gripping element 1 mounted on the carrying device 6. In the section below, a detailed description of the structure and the common structural components will be provided. In order to avoid unnecessary repetitions, the functional and/or structural differences of the individual embodiments will be emphasized in particular at a later point. For this reason, reference is made to this detailed, general description below.

FIGS. 4, 5, 6, 7 and 8 show longitudinal sections of a vacuum gripping element 1 mounted on the carrying device 6. In this regard, the vacuum gripping element 1 is designed for sucking in or holding a component to be transported when subjected to a vacuum. For this purpose, the vacuum gripping element 1 consists of an essentially hollow-cylindrical base body 2 in which a vacuum supply channel 3 is formed. Furthermore, an elastic, form-flexible sealing element 4 is formed which is connected to the base body 2 and is provided for sealing contact with a component to be transported. Moreover, a first fastening means 5, which is designed for fastening the vacuum gripping element 1 to the carrying device 6, is formed on the base body 2. In this regard, the base body 2 and the sealing element 4 are arranged along a main axis 7. In this regard, the first fastening means 5 is formed by a locking coupling 8 which can be quickly and easily activated and deactivated for positively connecting and releasing the vacuum gripping element 1 relative to the carrying device 6 as required.

In the region of its free, axial end face 15, the base body 2 can comprise a hollow-cylindrical fastening section 9 in which the locking coupling 8 is formed. The locking coupling 8 can comprise an actuator element 10, a spring element 11 and at least one locking element 12. In the shown exemplary embodiment, the locking coupling 8 comprises five locking elements 12, wherein, however, merely two of these are visible in the longitudinal section. It is also shown that the locking elements 12 are formed as balls 13. These balls 13 can be uniformly distributed over the circumference of the hollow-cylindrical fastening section 9. Alternatively, a pin-like design of the locking elements 12 is conceivable as well. The spring element 11 can urge the actuator element 10 into an axial end position, wherein the locking elements 12 can be urged into a locking position by the actuator element 10. Preferably, the spring element 11 is embodied as a compression spring, in particular as a helical spring.

Moreover, it results from FIGS. 4, 5, 6, 7 and 8 that the locking elements 12 can be mounted being adjustable relative to the main axis 7. In this regard, the actuator element 10 can be arranged within the hollow-cylindrical fastening section 9 and be mounted being adjustable along the main axis 7. The actuator element 10 can be embodied in the form of a slider or piston and, on its outer lateral surface of the actuator element 33, can have at least one contact surface 14 to the locking elements 12 and/or balls 13 that is inclined relative to the main axis 7. The hollow-cylindrical fastening section 9 can be limited by a, preferably radially circumferential, stop surface 16 starting from its axial end face 15 in the direction towards the sealing element 4. In this regard, this stop surface, as is shown, can be in direct contact with the carrier element 28 in the mounted state.

The actuator element 10 can, moreover, comprise an actuating surface 17 which is provided for the application of pressure starting out from a constructionally separate, pin-shaped actuating tool 18. The pin-shaped actuating tool 18 is shown in FIGS. 5, 7 and 8 and will be described in detail in the corresponding section.

A vacuum effect surface 19 limiting the vacuum supply channel 3 can be formed in the actuator element 10. This surface can be dimensioned such that when a vacuum is present in the vacuum supply channel 3, the actuator element 10 is increasingly urged into the direction of the axial end position in which the at least one locking element 12 is urged into a locking position by the actuator element 10.

With respect to the main axis 7, a supply section 20 can be formed between the hollow-cylindrical fastening section 9 and the sealing element 4. In the supply section 20, a vacuum supply connection 21, in particular a hose coupling 22 that can be actuated without a tool, can be formed in this regard. In the exemplary embodiment shown, two vacuum supply connections 21 are formed; however, other variants are conceivable as well. The vacuum supply connections 21 are fluidically connected to the vacuum supply channel 3. If required, the vacuum supply connections 21 can be connected to a vacuum generator device, in particular a vacuum pump, via a hose 23. A detailed view of the pneumatic hose connections will be shown in FIG. 10 below and elucidated in detail.

FIG. 4 shows a longitudinal section of a first embodiment of a vacuum gripping element 1 mounted on a carrying device 6. In particular, the vacuum gripping element 1 is releasably connected to the carrier element 28.

The spring element 11 can apply a force effect starting out from the free axial end face 15 of the base body 2 in the direction towards the sealing element 4. Hence, the actuator element 10 can be pushed into the direction of its end position. Consequently, in this mounted state, a latching and/or clamping effect can occur between the locking coupling 8 and the carrier element 28. In particular, a positive locking and/or clamping effect is established between the locking elements 12 and/or the balls 13 and the carrier element 28. It can be useful if the actuator element 10, which can be designed in the form of a slider or piston as shown, has a sealing ring 29. This sealing ring 29 can enable an airtight or nearly airtight seal between the supply section 20 and the fastening section 9. By a vacuum in the vacuum supply channel 3, the actuator element 10 is pulled in the direction of its locking end position, being at the bottom as shown, via its vacuum effect surface 19 in addition to the acting spring force.

FIG. 5 also shows a longitudinal section of this first embodiment of a vacuum gripping element 1, however, in its unlocked position during assembly or also during disassembly.

In FIG. 5, the actuation of the actuator element 10 is performed by manual application of pressure onto the actuating surface 17 by means of a separate, pin-shaped actuating tool 18. It is pushed by an operator, starting from the sealing element 4, through the supply section 20 and/or the vacuum supply channel 3 in the direction towards the free axial end face 15 of the base body 2. As soon as the actuating tool 18 reaches the actuating surface 17, the operator can push the actuator element 10 in the direction towards the free axial end face 15 against the spring force by the application of an actuating force which corresponds to the spring force. Thereby, the spring element 11 is compressed.

Hence, the clamping effect, i.e. the spring force, can be acted against temporarily and the locking elements 12 and/or the balls 13 can move inwards radially to the main axis 7. Consequently, the outside diameter of the locking coupling 8 is reduced such that it can be inserted into or guided out of the opening 25 and/or the bore 26 of the carrier element 28.

This first embodiment, which is shown in FIGS. 4 and 5, is particularly easy to handle during assembly. This can be explained by the fact that the direction of force is applied in the direction of assembly and/or insertion when the actuating surface 17 is actuated.

In an advancement not shown in the figures, it is possible, additionally, that a locking valve, in particular a back pressure valve, is formed in the vacuum supply channel 3, said locking valve closing the vacuum supply channel 3 in the direction towards the sealing element 4 when a vacuum is present in the vacuum supply channel 3. In further consequence, the actuator element 10 can have an excess pressure effect surface limiting the vacuum supply channel 3, said surface being dimensioned such that when an excess pressure is present in the vacuum supply channel 3, the actuator element 10 is urged into the direction of its position deactivating the at least one locking element 12. Thus, releasing the vacuum gripping element 1 from the carrying device 6 can be performed automatically.

FIG. 6 shows a longitudinal section of a second embodiment of a vacuum gripping element 1 mounted on a carrying device 6. In particular, the vacuum gripping element 1 is releasably connected to the carrier element 28.

This second embodiment of a vacuum gripping element 1 differs from the first embodiment of FIGS. 4 and 5 in that a force effect of the compression force spring element 11 acts on the actuator element 10 starting out from the sealing element 4 in the direction towards the free axial end face 15 of the base body 2. Thereby, the actuator element 10 is pulled into the direction of its end position via the spring force starting out from the spring element 11. Consequently, in this mounted state, locking effect and/or clamping effect can occur between the locking coupling 8 and the carrier element 28. In particular, a clamping effect is established between the locking elements 12 and/or the balls 13 and the carrier element 28. It can be useful if the hollow-cylindrical fastening section 9, as shown in FIGS. 6 and 7, is spatially separated from the supply section and is consequently closed off therefrom in an airtight manner FIG. 7 also shows a longitudinal section of this second embodiment of a vacuum gripping element 1, however, in its unlocked position during assembly or also during disassembly.

In FIG. 7, the actuation of the actuator element 10 is performed by manual application of pressure onto the actuating surface 17 by means of a pin-shaped actuating tool 18. It is pushed by an operator, starting from the free axial end face 15, through the hollow-cylindrical fastening section 9 in the direction towards the sealing element 4. As soon as the actuating tool 18 reaches the actuating surface 17, the operator can push the actuator element 10 in the direction towards the sealing element 4 against the spring force by the application of an actuating force which corresponds to the spring force. Thereby, the spring element 11 is compressed.

Hence, the clamping effect, i.e. the spring force, can be acted against temporarily and the locking elements 12 and/or the balls 13 can move inwards radially to the main axis 7. Consequently, the outside diameter of the locking coupling 8 is reduced such that it can be inserted into or guided out of the opening 25 and/or the bore 26 of the carrier element 28.

This second embodiment, which is shown in FIGS. 6 and 7, is particularly easy to handle during disassembly. This can be explained by the fact that the direction of force is applied in the direction of disassembly and/or in the direction of the decoupling direction of the vacuum gripping element 1 when the actuating surface 17 is actuated.

FIG. 8 shows a longitudinal section of a third embodiment of a vacuum gripping element 1 mounted on a carrying device 6 with an actuation tool 18. This third embodiment represent a variant to the first embodiment in FIGS. 4 and 5.

In the representation of FIG. 8, the actuating tool 18 applies a force onto the actuating surface 17 of the actuator element 10. This can be seen from the fact that the spring element 11 is compressed and the locking elements 12 have moved inwards radially to the main axis 7.

The application of pressure to the actuating surface 17 of the actuator element 10 in general works as described in FIG. 5. In this third embodiment, however, the actuation of the actuator element 10 is performed by automated application of pressure onto the actuating surface 17 by means of a robot-moved, pin-shaped actuating tool 18.

The robot-moved, pin-shaped actuating tool 18 is pushed, starting from the sealing element 4, through the supply section 20 and/or the vacuum supply channel 3 in the direction towards the free axial end face 15 of the base body 2. As soon as the actuating tool 18 reaches the actuating surface 17, the robots can push the actuator element 10 in the direction towards the free axial end face 15 against the spring force by the application of a force which corresponds to the spring force. Thereby, the spring element 11 is compressed.

Hence, the clamping effect, i.e. the spring force, can be acted against temporarily and the locking elements 12 and/or the balls 13 can move inwards radially to the main axis 7. Consequently, the outside diameter of the locking coupling 8 is reduced such that it can be inserted into or guided out of the opening 25 and/or the bore 26 of the carrier element 28.

According to this third embodiment, additionally to the pin-shaped section of the actuating tool 18, a plate-shaped and plane section is applied to the sealing element 4 for actuating the actuating surface 17. By the force effect in the direction towards the free axial end face 15, the plane section rests on the form-flexible sealing element 4 and/or the plane section pushes onto the form-flexible sealing element 4. The plate-shaped and plane section of the actuating tool 18 can be formed with a vacuum supply line 40 via which vacuum supply line 40 a vacuum can be applied in the sealing element 4. If required, the vacuum supply line 40 can be connectable to a vacuum generator device, in particular a vacuum pump. To allow for a vacuum to exist between the sealing element 4 and the plate-shaped and plane section of the pin-shaped actuating tool 18, it can be advantageous if the pin-shaped region of the pin-shaped actuating tool is formed for sealing the vacuum supply channel 3 in the base body 2. The sealing effect can be achieved, for example, by means of a seal on the pin jacket.

Instead of the formation of at least one compression spring as the spring element 11, it is also possible to provide at least one tension spring. The respective force directions relative to the actuator element 10 and/or relative to the at least one locking element 12 merely have to be adapted accordingly.

This third embodiment, which is shown in FIG. 8, is particularly easy to handle during assembly, but also during disassembly.

For better understanding of the embodiments described above, FIG. 9 shows a three-dimensional view of a fourth embodiment of a vacuum gripping element 1. In this regard, the vacuum gripping element 1 comprises a base body 2 and an elastic, form-flexible sealing element 4. A first fastening means 5 on the base body 2 is formed for fastening the vacuum gripping element 1 to the carrying device 6, wherein the carrying device 6, which is preferably designed to be merely plate-shaped and is made of a piece of sheet metal, is not shown in FIG. 9. The base body 2 and the sealing element 4 are arranged along a main axis 7. The first fastening means 5 is formed by a locking coupling 8.

In particular, the base body 2 may comprise a hollow-cylindrical fastening section 9. The locking coupling 8 can comprise locking elements 12 in the particular embodiment of balls 13. Four of the balls 13 arranged being distributed around the circumference of the hollow-cylindrical fastening section 9 are visible. The hollow-cylindrical fastening section 9 can be limited by a stop surface 16 starting from its axial end face 15 in the direction towards the sealing element 4. With respect to the main axis 7, a supply section 20 can be formed between the hollow-cylindrical fastening section 9 and the sealing element 4. FIG. 9 also shows that a vacuum supply connection 21, in particular a hose coupling 22 that can be actuated without a tool, can be formed in the supply section 20. In particular, two opposite vacuum supply connections 21 are formed.

FIG. 10 shows a three-dimensional detailed view of a fourth embodiment of a vacuum gripping device 24 with a vacuum gripping element 1 with pneumatic connections and a carrying device 6. In this regard, the vacuum gripping element 1 is releasably connected to the carrying device.

To describe FIG. 10, equal reference numbers and/or component designations are used for equal parts as in FIG. 1 before. In order to avoid unnecessary repetitions, at this point, it is therefore pointed to/reference is made to the detailed description in FIG. 1 preceding it. In addition to FIG. 1, FIG. 10 shows a conceivable arrangement of pneumatic hose lines. A vacuum supply connection 21 is formed by a hose coupling 22, which can be actuated without a tool, and is fluidically connected to the vacuum supply channel 3. Moreover, the vacuum supply connection 21 can be connected, as required, to a vacuum generator device and/or an electropneumatic valve via a hose 23, in particular a pneumatic hose.

FIG. 11 shows a further and optionally independent embodiment of a vacuum gripping device 24, wherein equal reference numbers and/or component designations are used for equal parts as in FIG. 1 before. In order to avoid unnecessary repetitions, at this point, it is therefore pointed to/reference is made to the detailed description in FIG. 1 preceding it.

FIG. 11 shows a three-dimensional exploded view of a fifth embodiment of a vacuum gripping device 24 with, for example, six vacuum gripping elements 1 and a carrying device 6. In the shown, fifth embodiment of the vacuum gripping device 24, the carrying device 6 comprises a plane, plate-shaped carrier element 28 with six openings 25 in the particular embodiment of circular bores 26 that are easy to produce.

According to the exemplary embodiment, the six constructionally identical vacuum gripping elements 1 shown in FIG. 11 essentially consist of a first base body part 30, a second base body part 31 and a sealing element 4. The sealing element 4 is a form-flexible, elastic suction bell made of a plastic material. The first base body part 30 is positively connected to the carrying device 6 by means of the first fastening means 5. The second base body part 31 is connected to the sealing element 4. The outlined base body 2 comprises a fastening section 9 and a supply section 20. A second fastening means 32 is formed for positively connecting and releasing the first base body part 30 relative to the second base body part 31 as required by means of a locking coupling 8'. Here, the fastening section 9 is formed hollow-cylindrically. In this regard, the outside diameter of the first base body part 30 is slightly smaller or equal to the bores 26 such that simple assembly and disassembly is possible but nevertheless no undesirably large clearance is given, respectively no unfavorably large gap is created. The six shown vacuum gripping elements 1 are preferably arranged at a right angle to the plate-shaped carrier element 28 in relation to a main axis 7 of the vacuum gripping element 1.

FIGS. 12, 13, 14 and 15 show longitudinal sections of two further embodiments of a vacuum gripping element 1 mounted on the carrying device 6. In the section below, a detailed description of the structure and the common structural components will be provided. In order to avoid unnecessary repetitions, the functional and/or structural differences of the individual embodiments will be emphasized in particular at a later point. For this reason, reference is made to this detailed, general description below.

FIGS. 12, 13, 14 and 15 show longitudinal sections of a vacuum gripping element 1 mounted on the carrying device 6. In this regard, the vacuum gripping element 1 is designed for sucking in or holding a component to be transported when subjected to a vacuum. For this purpose, the vacuum gripping element 1 consists of an essentially hollow-cylindrical base body 2, which comprises a first base body part 30 and a second base body part 31 and in which a vacuum supply channel 3 is formed. Furthermore, an elastic, form-flexible sealing element 4 is formed which is connected to the second base body part 31 and is provided for sealing contact with a component to be transported. Moreover, a first fastening means 5 is formed which is configured for positively connecting and releasing the first base body part 30 on the carrying device 6 as required. In this regard, the base body 2 and the sealing element 4 are arranged along a main axis 7. A second fastening means 32 is formed by a locking coupling 8' which can be quickly and easily activated and deactivated for positively connecting and releasing the first base body part 30 relative to the second base body part 31 as required.

In the region of its free, axial end face 15, the base body 2 can comprise a hollow-cylindrical fastening section 9 in which the locking coupling 8' is formed. The locking coupling 8' can comprise an actuator element 10, a spring element 11 and at least one locking element 12. In the shown exemplary embodiment, the locking coupling 8' comprises five locking elements 12, wherein, however, merely two of these are visible in the longitudinal section. It is also shown that the locking elements 12 are formed as balls 13. These balls 13 can be uniformly distributed over the circumference of the hollow-cylindrical fastening section 9. Alternatively, for example, a pin-like design of the locking elements 12 is conceivable as well. The spring element 11 can urge the actuator element 10 into an axial end position, wherein the locking elements 12 can be urged into a locking position by the actuator element 10. Preferably, the spring element 11 is embodied as a compression spring, in particular as a helical spring.

Moreover, it results from FIGS. 12, 13, 14 and 15 that the locking elements 12 can be mounted being adjustable relative to the main axis 7. In this regard, the actuator element 10 can be arranged within the hollow-cylindrical fastening section 9 and be mounted being adjustable along the main axis 7. The actuator element 10 can be embodied in the form of a slider or piston and, on its outer lateral surface of the actuator element 33, can have at least one contact surface 14 to the locking elements 12 and/or balls 13 that is inclined relative to the main axis 7. An annular-groove-shaped inner jacket indentation 35 for receiving the at least one locking element 12 can be formed on the inner lateral surface 34 of the second base body part 31.

The actuator element 10 can, moreover, comprise an actuating surface 17 which is provided for the application of pressure starting out from a constructionally separate, pin-shaped actuating tool 18. The pin-shaped actuating tool 18 is shown in FIG. 13 and will be described in detail in the corresponding section.

A vacuum effect surface 19 limiting the vacuum supply channel 3 can be formed in the actuator element 10. This surface can be dimensioned such that when a vacuum is present in the vacuum supply channel 3, the actuator element 10 is increasingly urged into the direction of the axial end position in which the at least one locking element 12 is urged into a locking position by the actuator element 10.

With respect to the main axis 7, a supply section 20 can be formed between the hollow-cylindrical fastening section 9 and the sealing element 4. In this regard, as shown in FIGS. 12, 13 and 14, the supply section 20 can be formed for supplying the vacuum gripping element 1 with a vacuum at the second base body part 31. Alternatively, as shown in FIG. 15, the supply section 20 can be formed for supplying the vacuum gripping element 1 with a vacuum at the first base body part 30. In the supply section 20, a vacuum supply connection 21, in particular a hose coupling 22 that can be actuated without a tool, can be formed in this regard. In the exemplary embodiment shown, two vacuum supply connections 21 are formed; however, other variants are conceivable as well. The vacuum supply connections 21 are fluidically connected to the vacuum supply channel 3. If required, the vacuum supply connections 21 can be connected to a vacuum generator device, in particular a vacuum pump, via a hose 23. A detailed view of the pneumatic hose connections is shown in FIG. 10.

It can be useful if the vacuum supply channel 3 is embodied being flow-tight after positively connecting the first base body part 30 relative to the second base body part 31 by means of the locking coupling 8'. The first fastening means 5 can be formed by a spring ring 38 arranged in an annular-groove-shaped outer jacket indentation 36 on the outer lateral surface 37 of the first base body part 30. Alternatively or additionally, but not being shown in the Figures, the first fastening means 5 can also be formed by a thread arranged on the outer lateral surface 37 of the first base body part 30. Moreover, the stability of the fastening can be improved if the first base body part 30 is limited by at least one flange surface 39 starting out from the sealing element 4 in the direction towards an axial end face 15.

FIG. 12 shows a longitudinal section of a fifth embodiment of a vacuum gripping element 1 mounted on a carrying device 6. In particular, the vacuum gripping element 1, more precisely the first base body part 30, is releasably connected to the carrier element 28.

The spring element 11 can apply a force effect starting out from the free axial end face 15 of the base body 2 in the direction towards the sealing element 4. Hence, the actuator element 10 can be pushed into the direction of its end position. Consequently, in this mounted state, a latching and/or clamping effect can occur between the locking coupling 8' and the second base body part 31. In particular, a positive locking and/or clamping effect is established between the locking elements 12 and/or the balls 13 and the second base body part 31. In this regard, the locking elements 12 and/or the balls 13 are received in the annular-groove-shaped inner jacket indentation 35 on the inner lateral surface 34. It can be useful if the actuator element 10, which can be designed in the form of a slider or piston as shown, has a sealing ring 29. This sealing ring 29 can enable an airtight or nearly airtight seal between the supply section 20 and the fastening section 9. By a vacuum in the vacuum supply channel 3, the actuator element 10 is pulled in the direction of its locking end position, being at the bottom as shown, via its vacuum effect surface 19 in addition to the acting spring force.

FIG. 13 also shows a longitudinal section of this fifth embodiment of a vacuum gripping element 1, however, in its unlocked position during assembly or also during disassembly of the second base body part 31 from the first base body part 30.

In FIG. 13, the actuation of the actuator element 10 is performed by manual application of pressure onto the actuating surface 17 by means of a separate, pin-shaped actuating tool 18. It is pushed by an operator, starting from the sealing element 4, through the supply section 20 and/or the vacuum supply channel 3 in the direction towards the free axial end face 15 of the base body 2. As soon as the actuating tool 18 reaches the actuating surface 17, the operator can push the actuator element 10 in the direction towards the free axial end face 15 against the spring force by the application of an actuating force which corresponds to the spring force. Thereby, the spring element 11 is compressed.

Hence, the clamping effect, i.e. the spring force, can be acted against temporarily and the locking elements 12 and/or the balls 13 can move inwards radially to the main axis 7. In further consequence, the outside diameter of the locking coupling 8' is reduced such that releasing the second base body part 31 from the first base body part 30 is possible.

FIG. 14 also shows a longitudinal section of this fifth embodiment of a vacuum gripping element 1 before assembly or after disassembly. In particular, the second base body part 31 is detached from the first base body part 30.

FIG. 15 shows a longitudinal section of a sixth embodiment of a vacuum gripping element 1 mounted on a carrying device 6. In particular, the vacuum gripping element 1, more precisely the first base body part 30, is releasably connected to the carrier element 28.

With respect to the main axis 7, a supply section 20 can be formed between the hollow-cylindrical fastening section 9 and the sealing element 4. The supply section 20 can be formed for supplying the vacuum gripping element 1 with a vacuum at the first base body part 30. The vacuum can spread between the vacuum supply channel 3 and the sealing element 4 via a, for example circular, passage in the actuator element. A pin-shaped actuating tool 18 can be adapted to the geometry of the actuating surface 17 for efficient actuation of the actuating surface 17.

To assemble and/or disassemble the first base body part 30 relative to the carrying device 6, it can be useful if the opening 25 has a contour which is formed such that the first base body part 30 can be inserted. Furthermore, the flange surface 39 can be formed by a nut which can be screwed onto the first base body part 30.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Vacuum gripping element
2 Base body
3 Vacuum supply channel
4 Sealing element
5 First fastening means
6 Carrying device
7 Main axis
8, 8' Locking coupling jacket indentation
9 Hollow-cylindrical fastening section
10 Actuator element
11 Spring element
12 Locking element
13 Ball
14 Contact surface
15 Free, axial end face
16 Stop surface
17 Actuating surface
18 Pin-shaped actuating tool
19 Vacuum effect surface
20 Supply section
21 Vacuum supply connection
22 Hose coupling
23 Hose
24 Vacuum gripping device
25 Opening
26 Bore
27 Coupling means
28 Carrier element
29 Sealing ring
30 First base body part
31 Second base body part
32 Second fastening means
33 Outer lateral surface of the actuator element
34 Inner lateral surface
35 Annular-groove-shaped inner jacket indentation
36 Annular-groove-shaped outer jacket indentation
37 Outer lateral surface
38 Spring ring
39 Flange surface
40 Vacuum supply line

The invention claimed is:

1. A vacuum gripping element (1), which is configured to suck or hold a component to be transported when subjected to a vacuum, comprising a base body (2) with at least one vacuum supply channel (3), an elastic, form-flexible sealing element (4), which is connected to the base body (2) and is provided for sealing contact with the component to be transported, a first fastening means (5) on the base body (2) for fastening the vacuum gripping element (1) on a carrying device (6), wherein the base body (2) and the sealing element (4) are arranged along a main axis (7) of the vacuum gripping element (1), wherein the first fastening means (5) is formed by a locking coupling (8) for positively connecting and releasing the vacuum gripping element (1) relative to the carrying device (6) as required, or wherein the base body (2) comprises a first base body part (30) and a second base body part (31), said first base body part (30) being provided for positively connecting and releasing relative to the carrying device (6) as required by means of the first fastening means (5), and said second base body part (31) being connected to the elastic, form-flexible sealing element (4), and wherein a second fastening means (32) for positively connecting and releasing the first base body part (30) relative to the second base body part (31) is formed by a locking coupling (8), and wherein the base body (2) comprises a hollow-cylindrical fastening section (9) in which the locking coupling (8, 8') is formed, and wherein the locking coupling (8, 8') comprises an actuator element (10), a spring element (11) and at least one locking element (12), wherein the spring element (11) urges the actuator element (10) into an end position, and wherein the at least one locking element (12) is urged into a locking position by the actuator element (10), wherein the actuator element (10) is arranged within the hollow-cylindrical fastening section (9) and is mounted so as to be adjustable along the main axis (7), and wherein the actuator element (10) comprises an actuating surface (17) which is provided for the application of pressure starting out from a constructionally separate, pin-shaped actuating tool (18).

2. The vacuum gripping element (1) according to claim 1, wherein the at least one locking element (12) is mounted so as to be adjustable radially to the main axis (7).

3. The vacuum gripping element (1) according to claim 1, wherein at least one locking element (12) is embodied as a ball (13), in particular by at least three, preferably five, balls (13) arranged so as to be distributed across the circumference of the hollow-cylindrical fastening section (9).

4. The vacuum gripping element (1) according to claim 1, wherein the actuator element (10) is embodied in the form of a slider or piston and, on its outer lateral surface of the actuator element (33), has at least one contact surface (14) to the at least one locking element (12) that is inclined relative to the main axis (7).

5. The vacuum gripping element (1) according to claim 1, wherein an annular-groove-shaped inner jacket indentation (35) is formed on the inner lateral surface (34) of the second base body part (31) for receiving the at least one locking element (12).

6. The vacuum gripping element (1) according to claim 1, wherein the hollow-cylindrical fastening section (9) is limited by at least one stop surface (16) starting from its axial end face (15) in the direction towards the sealing element (4).

7. The vacuum gripping element (1) according to claim 1, wherein a force effect of the spring element (11) acts on the actuator element (10) starting out from a free axial end face (15) of the base body (2) in the direction towards the sealing element (4).

8. The vacuum gripping element (1) according to claim 1, wherein a force effect of the spring element (11) acts on the actuator element (10) starting out from the sealing element (4) in the direction towards a free axial end face (15) of the base body (2).

9. The vacuum gripping element (1) according to claim 1, wherein the actuator element (10) has a vacuum effect surface (19) limiting the vacuum supply channel (3), said vacuum effect surface (19) being dimensioned such that when a vacuum is present in the vacuum supply channel (3), the actuator element (10) is increasingly urged into the direction of the axial end position in which the at least one locking element (12) is urged into a locking position by the actuator element (10).

10. The vacuum gripping element (1) according to claim 1, wherein a locking valve, in particular a back pressure valve, is formed in the vacuum supply channel (3), said locking valve closing the vacuum supply channel (3) in the direction towards the sealing element (4) when a vacuum is present in the vacuum supply channel (3).

11. The vacuum gripping element (1) according to claim 10, wherein the actuator element (10) comprises an excess pressure effect surface limiting the vacuum supply channel (3), said excess pressure effect surface being dimensioned such that when an excess pressure is present in the vacuum supply channel (3), the actuator element (10) is urged into the direction of its position deactivating the at least one locking element (12).

12. The vacuum gripping element (1) according to claim 1, wherein a supply section (20) is formed between the hollow-cylindrical fastening section (9) and the sealing element (4) in relation to the main axis (7).

13. The vacuum gripping element (1) according to claim 12, wherein the supply section (20) is formed for supplying the vacuum gripping element (1) with a vacuum at the first base body part (30).

14. The vacuum gripping element (1) according to claim 12, wherein the supply section (20) is formed for supplying the vacuum gripping element (1) with a vacuum at the second base body part (31).

15. The vacuum gripping element (1) according to claim 12, wherein a vacuum supply connection (21), in particular at least one hose coupling (22) that can be actuated without a tool, is formed in the supply section (20) and is fluidically connected to the vacuum supply channel (3) and wherein the vacuum supply connection (21) can be connected to a vacuum generator device via a hose (23) if required.

16. The vacuum gripping element (1) according to claim 1, wherein the vacuum supply channel (3) is embodied to be flow-tight after positively connecting the first base body part (30) relative to the second base body part (31) by means of the locking coupling (8').

17. The vacuum gripping element (1) according to claim 1, wherein the first fastening means (5) is formed by a spring ring (38) arranged in an annular-groove-shaped outer jacket indentation (36) on the outer lateral surface (37) of the first base body part (30).

18. The vacuum gripping element (1) according to claim 1, wherein the first fastening means (5) is formed by a thread arranged on the outer lateral surface (37) of the first base body part (30).

19. The vacuum gripping element (1) according to claim 1, wherein the first base body part (30) is limited by at least one flange surface (39) starting out from the sealing element (4) in the direction towards an axial end face (15).

20. A vacuum gripping device (24), which is configured to suck or hold a component to be transported when subjected to a vacuum, comprising
a carrying device (6) and at least one vacuum gripping element (1) according to claim 1, connected to the carrying device (6) so as to be releasable as needed.

21. The vacuum gripping device (24) according to claim 20, wherein the carrying device (6) comprises at least one opening (25) for receiving a hollow-cylindrical fastening section (9) of the at least one vacuum gripping element (1).

22. The vacuum gripping device (24) according to claim 21, wherein the at least one opening (25) is a circular bore (26).

23. The vacuum gripping device (24) according to claim 22, wherein the circular bore (26) comprises a thread for receiving the first base body part (30).

24. The vacuum gripping device (24) according to claim 20, wherein the carrying device (6) comprises a coupling means (27) for connection to a manipulator as required in a central section.

25. The vacuum gripping device (24) according to claim 20, wherein the carrying device (6) comprises a plate-shaped carrier element (28), said plate-shaped carrier element (28) being plane or having a DIN-rail-shaped or C-shaped cross section.

26. The vacuum gripping device (24) according to claim 25, wherein the main axis (7) of the vacuum gripping element (1) is arranged at a right angle to the plate-shaped carrier element (28).

* * * * *